(12) United States Patent
Chen et al.

(10) Patent No.: US 9,985,762 B2
(45) Date of Patent: May 29, 2018

(54) DISCOVERY SIGNALS AND NETWORK SYNCHRONIZATION SIGNALS DESIGN IN LTE

(71) Applicant: QUALCOMM Incorporated, San Diego, CA (US)

(72) Inventors: Wanshi Chen, San Diego, CA (US); Peter Gaal, San Diego, CA (US); Aleksandar Damnjanovic, Del Mar, CA (US); Michael Mao Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/633,621

(22) Filed: Jun. 26, 2017

(65) Prior Publication Data

US 2017/0295002 A1    Oct. 12, 2017

Related U.S. Application Data

(62) Division of application No. 14/585,155, filed on Dec. 29, 2014.
(Continued)

(51) Int. Cl.
*H04L 5/00* (2006.01)
*H04W 72/04* (2009.01)
(Continued)

(52) U.S. Cl.
CPC .......... *H04L 5/0048* (2013.01); *H04W 8/005* (2013.01); *H04W 56/001* (2013.01); *H04W 72/0446* (2013.01)

(58) Field of Classification Search
CPC .. H04L 5/0048; H04L 5/0073; H04W 56/001; H04W 56/0015; H04W 72/082; H04W 8/005
See application file for complete search history.

(56) References Cited

U.S. PATENT DOCUMENTS 8,009,660 B2    8/2011   Li et al.
9,237,473 B2    1/2016   Kazmi et al.
(Continued)

FOREIGN PATENT DOCUMENTS

WO    2011050539 A1    5/2011

OTHER PUBLICATIONS

Del Peral-Rosado J.A., et al., "Achievable localization accuracy of the positioning reference signal of 3GPP LTE," 2012 International Conference on Localization and GNSS, 2012, DOI: 10.1109ICL-GNSS.2012.6253127, pp. 1-6.
(Continued)

*Primary Examiner* — Mounir Moutaouakil
(74) *Attorney, Agent, or Firm* — Nerrie M. Zohn

(57) ABSTRACT

Base stations (such as small cells) may support active and dormant states. To facilitate state transitions, these cells may transmit discovery signals. The transmission design of both discovery signals and network synchronization signals from small cells should provide for regular periodicity, while supporting the benefit of transitioning between active and dormant states. Disclosed is a method, a computer program product, and an apparatus that determine a first reference signal for at least one of discovery or measurement, and a second reference signal for synchronization, where both the first reference signal and the second reference signal are based on a same type of reference signal.

28 Claims, 21 Drawing Sheets

Related U.S. Application Data

(60) Provisional application No. 61/932,685, filed on Jan. 28, 2014.

(51) Int. Cl.
*H04W 56/00* (2009.01)
*H04W 8/00* (2009.01)

(56) References Cited

U.S. PATENT DOCUMENTS

| | | | |
|---|---|---|---|
| 9,270,436 | B2 | 2/2016 | Liu et al. |
| 9,326,281 | B2 | 4/2016 | Kim et al. |
| 9,769,690 | B2 | 9/2017 | Mo et al. |
| 9,819,462 | B2 | 11/2017 | Baker et al. |
| 2010/0260169 | A1 | 10/2010 | Gheorghiu et al. |
| 2010/0273506 | A1 | 10/2010 | Stern-Berkowitz et al. |
| 2011/0211503 | A1 | 9/2011 | Che et al. |
| 2012/0224533 | A1* | 9/2012 | Lin ............... H04W 56/002 370/328 |
| 2013/0089065 | A1 | 4/2013 | Koorapaty et al. |
| 2013/0121246 | A1 | 5/2013 | Guey et al. |
| 2014/0126568 | A1 | 5/2014 | Berggren |
| 2015/0029874 | A1 | 1/2015 | Davydov et al. |
| 2015/0049741 | A1 | 2/2015 | Chen et al. |
| 2015/0189574 | A1 | 7/2015 | Ng et al. |
| 2015/0195823 | A1 | 7/2015 | Seo et al. |
| 2015/0215761 | A1 | 7/2015 | Chen et al. |
| 2015/0256279 | A1* | 9/2015 | Davydov ............ H04W 72/12 370/329 |
| 2015/0334555 | A1 | 11/2015 | Seo et al. |
| 2015/0350928 | A1 | 12/2015 | Zhang et al. |
| 2015/0350945 | A1 | 12/2015 | Chae et al. |
| 2016/0006549 | A1 | 1/2016 | Kim et al. |
| 2016/0278030 | A1 | 9/2016 | Yi et al. |
| 2016/0315740 | A1* | 10/2016 | Yi ..................... H04W 72/005 |
| 2017/0135062 | A1* | 5/2017 | Stern-Berkowitz . H04W 64/003 |
| 2017/0311144 | A1 | 10/2017 | Chen et al. |
| 2017/0359820 | A1 | 12/2017 | Gaal et al. |
| 2018/0034608 | A1 | 2/2018 | Seo et al. |
| 2018/0042025 | A1 | 2/2018 | Opshaug et al. |

OTHER PUBLICATIONS

International Search Report and Written Opinion—PCT/US2014/072841—ISA/EPO—Jul. 6, 2015.
Partial International Search Report—PCT/US2014/072841—ISA/EPO—Apr. 16, 2015.
Hisilicon H., et al., "Draft text Proposal on Feasibility and Benefits of Radio-Interface Based Synchronization Mechanisms". 3GPP TSG-RAN WG1#74 R1-133994, 3GPP, Aug. 26, 2013, Paragraph 7.3., 6 Pages.
Huawei, Hisilicon: "Enhanced Mechanisms for Network Listening", 3GPP TSG-RAN WG1#74b R1-134067, 3GPP, Sep. 28, 2013, Paragraph 2., 5 Pages.
NTT DOCOMO., "Small Cell Discovery for Efficient Small Cell On/Off Operation", 3GPP Draft; R1-133457, 3rd Generation Partnership Project (3GPP), vol. RAN WG1, No. Barcelona, Spain; Aug. 19, 2013 Aug. 23, 2013, Aug. 10, 2013 (Aug. 10, 2013), XP050716565, Retrieved from the Internet: URL:http://www.3gpp.org/ftp/tsg_ran/WG1_RL1/TSGR1_74/Docs/ [retrieved on Aug. 10, 2013].

* cited by examiner

DISCOVERY SIGNALS AND NETWORK SYNCHRONIZATION SIGNALS DESIGN IN LTE

CROSS-REFERENCE TO RELATED APPLICATIONS

This application is a divisional of U.S. patent application Ser. No. 14/585,155, entitled "DISCOVERY SIGNALS AND NETWORK SYNCHRONIZATION SIGNALS DESIGN IN LTE" and filed on Dec. 29, 2014, which claims the benefit of U.S. Provisional Application Ser. No. 61/932,685, entitled "DISCOVERY SIGNALS AND NETWORK SYNCHRONIZATION SIGNALS DESIGN IN LTE" and filed on Jan. 28, 2014, which is expressly incorporated by reference herein in its entirety.

BACKGROUND

Field

The present disclosure relates generally to communication systems, and more particularly, to discovery signals and network synchronization signal design in LTE.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Small cell densification (e.g., low power base stations), has potential benefits through a more optimal use of spectrum, but also poses challenging design issues in mobile communications. These design issues may include mobility handling, interference handling, etc. Macro cells may or may not be deployed in the same geographical region as small cells. Small cells may be of the same carrier frequency (co-channel) or a different carrier frequency from macro cells.

In order to better manage small cells, the small cells support active and dormant states. For example, a small cell may be in an active state (e.g., ON state) when it serves a minimum number of UEs, may enter a dormant state (e.g., OFF state) when not serving any UEs, or may handoff UEs and enter a dormant state when serving less than some minimum threshold of UEs. A small cell in the dormant state may be reactivated and enter the active state when UEs come within proximity of the small cell. In order to facilitate active/dormant state transitions of small cells, the small cells may transmit discovery signals. In one example, a small cell may be configured to transmit discovery signals while in the dormant state. In another example, a small cell may be configured to transmit discovery signals while either in the dormant state or the active state.

One of the issues with designing small cells is to provide a design for the transmission of both discovery signals and network synchronization signals with sufficiently regular periodicity, while supporting active and dormant states. In an aspect of the disclosure, a method, a computer program product, and an apparatus are provided. The apparatus may be an evolved Node B (eNB). The apparatus determines a first reference signal for at least one of discovery or measurement, and a second reference signal for synchronization, where both the first reference signal and the second reference signal are based on a same type of reference signal. For example, the same type of reference signal may be a positioning reference signal (PRS). The apparatus transmits the first reference signal in one or more symbols of a first set of subframes and transmits the second reference signal in one or more symbols of a second set of subframes, where the first set of subframes and the second set of subframes differ at least by one subframe.

In an aspect of the disclosure, a method, a computer program product, and an apparatus are provided. The apparatus may be a user equipment (UE). The apparatus receives at least one of a first reference signal for at least one of discovery or measurement or a second reference signal for synchronization, at least one of the first or second reference signals having a bandwidth configured by a base station (BS), and detects at least one cell based on at least one of the first or second reference signals.

DETAILED DESCRIPTION

Figure 1:
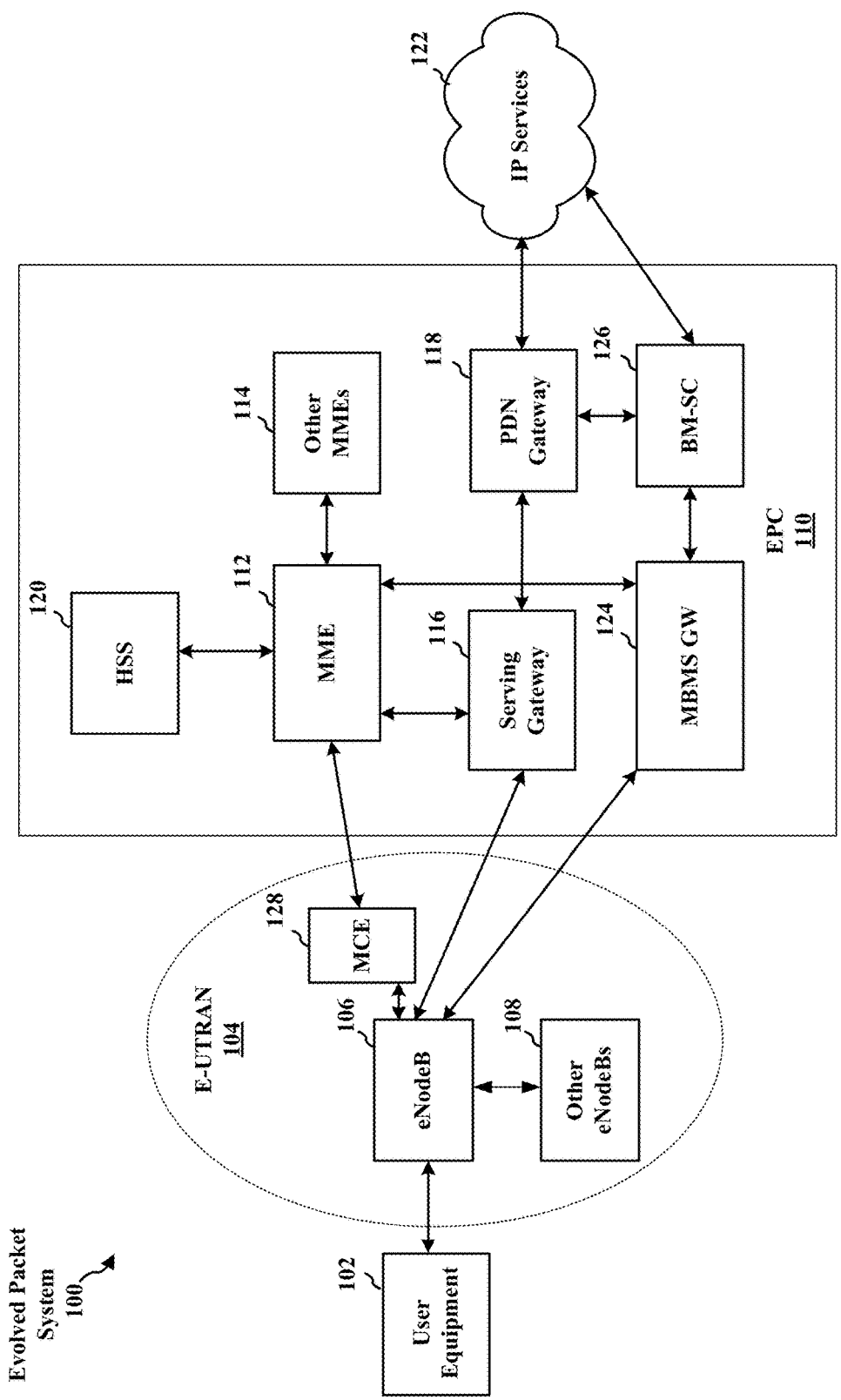
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
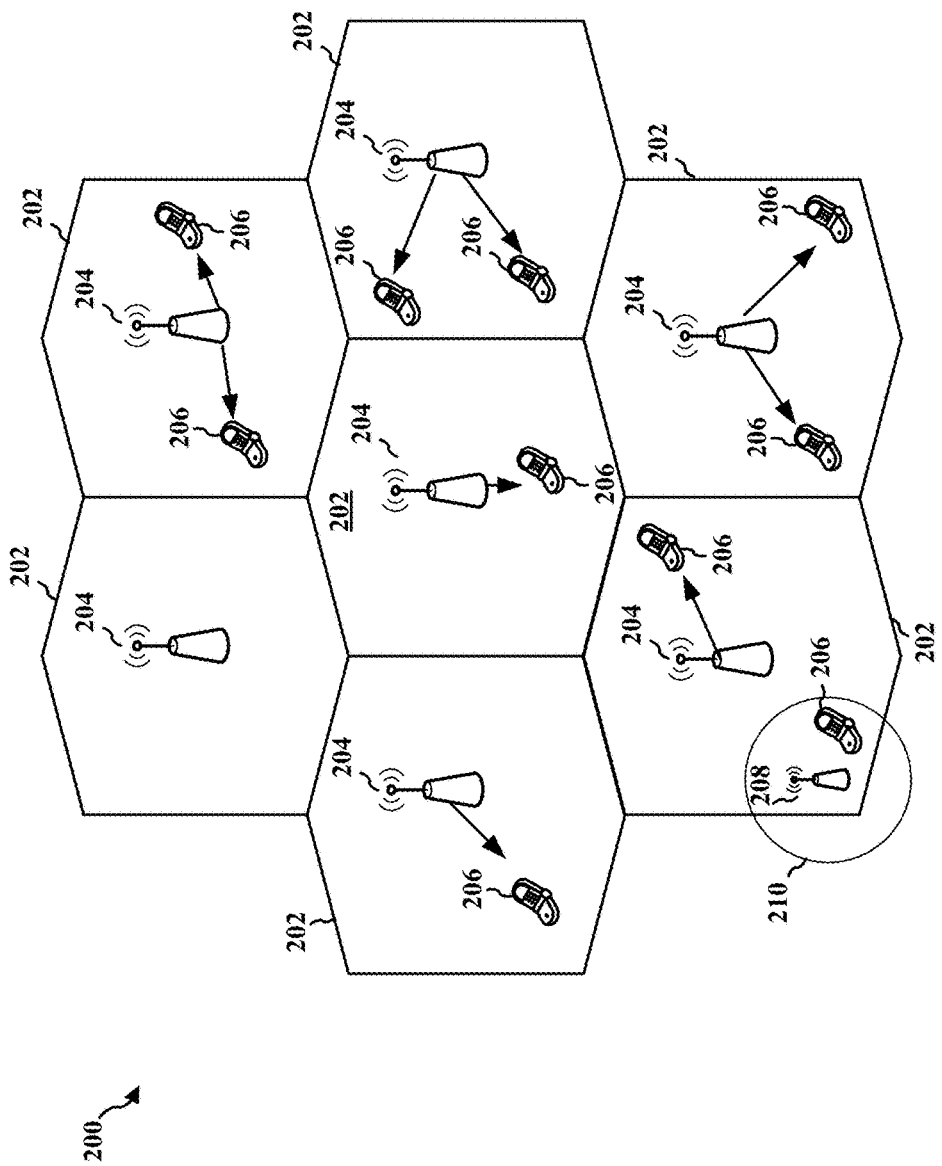
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

Figure 3:
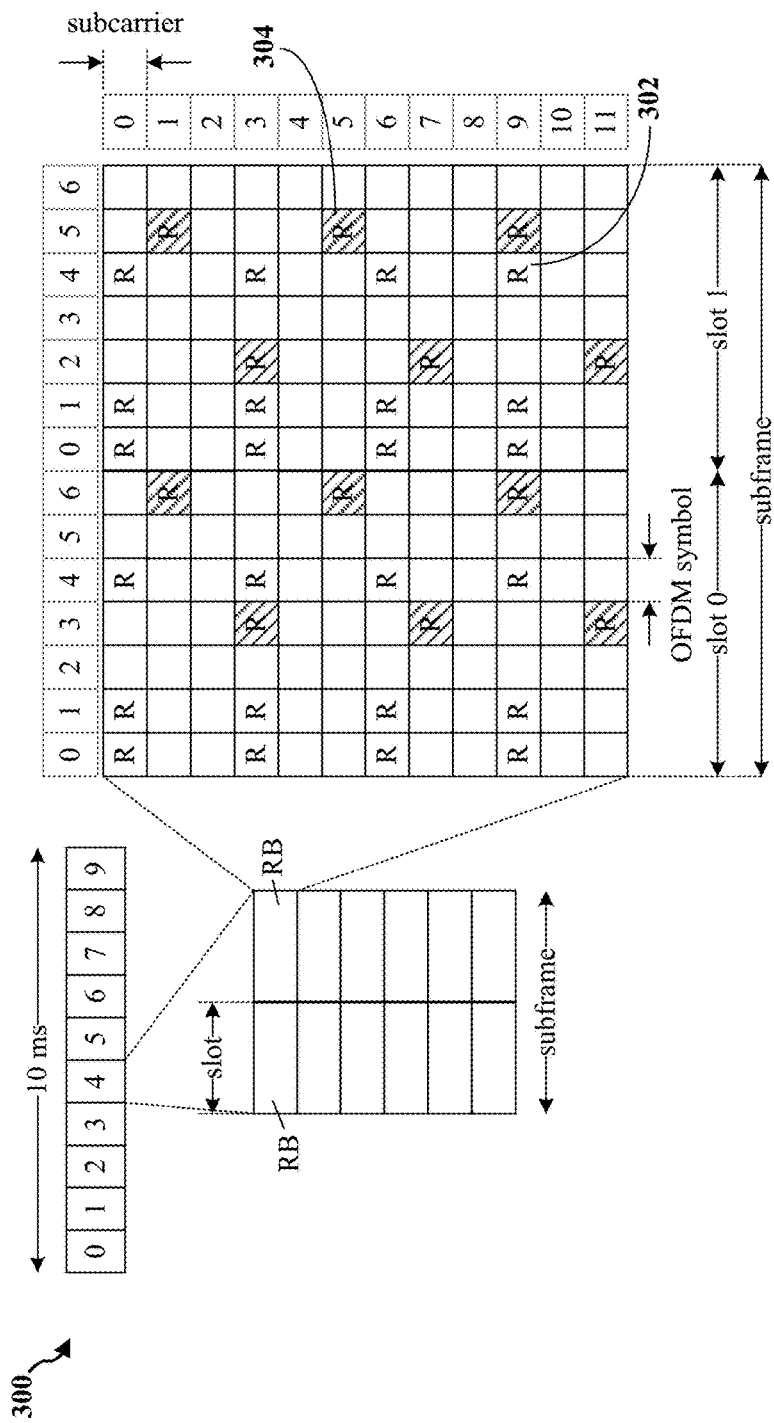
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

Figure 5:
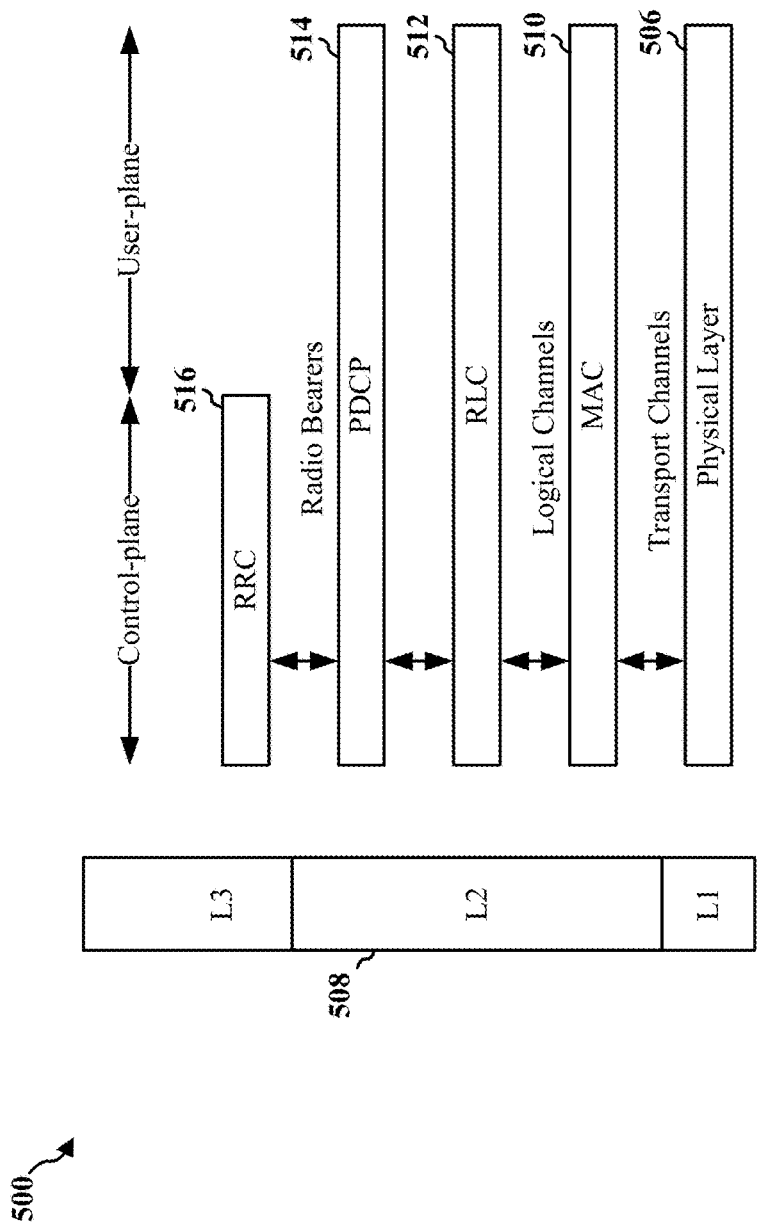
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
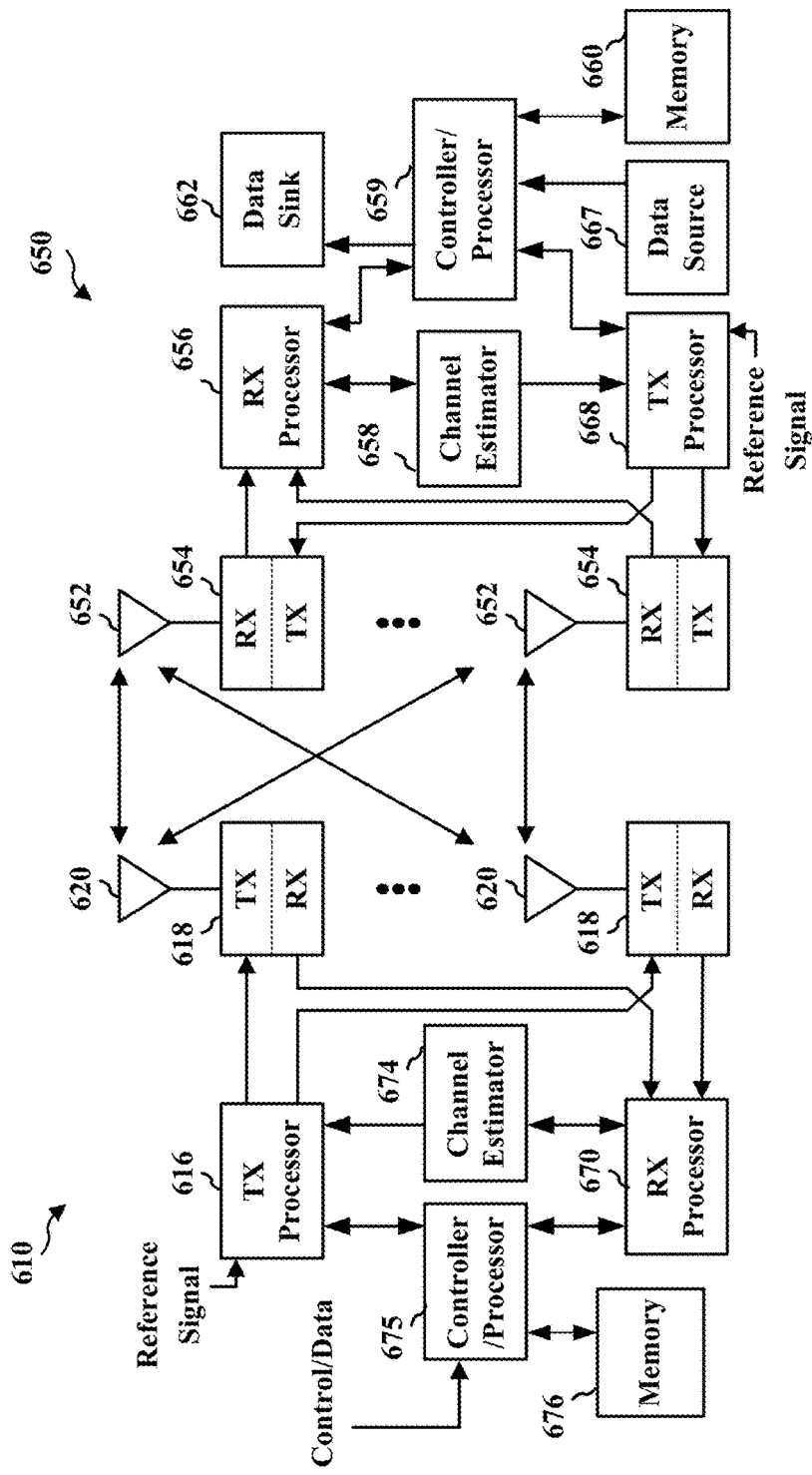
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

In order to boost cellular communication performance in a cellular network, a number of small cells (e.g., low power base stations) may be deployed within a cell area served by a macro cell. Small cell densification (e.g., increasing the number of proximate small cells within an area) poses challenging design issues in mobile communications. Such design issues may include mobility handling, interference handling, etc. Macro cells may or may not be deployed in the same geographical region as small cells. Small cells may be of the same carrier frequency (co-channel) or a different carrier frequency from macro cells.

In order to better manage small cells, small cells may support active and dormant states. For example, a small cell may be in an active state (e.g., ON state) when it serves at least one UE (or a minimum number of UEs) and may be in a dormant state (e.g., OFF state) when not serving any UEs (or a minimum number of UEs). A small cell in the dormant state may be reactivated and enter the active state when there are UEs moving close to the small cell. In order to facilitate active/dormant state transitions, small cells may transmit discovery signals. In one example, a small cell may be configured to transmit discovery signals while in the dormant state. In another example, a small cell may be configured to transmit discovery signals while either in the dormant state or the active state. For example, the discovery signals may be used for coarse time/frequency synchronization and/or measurement.

Figure 7:
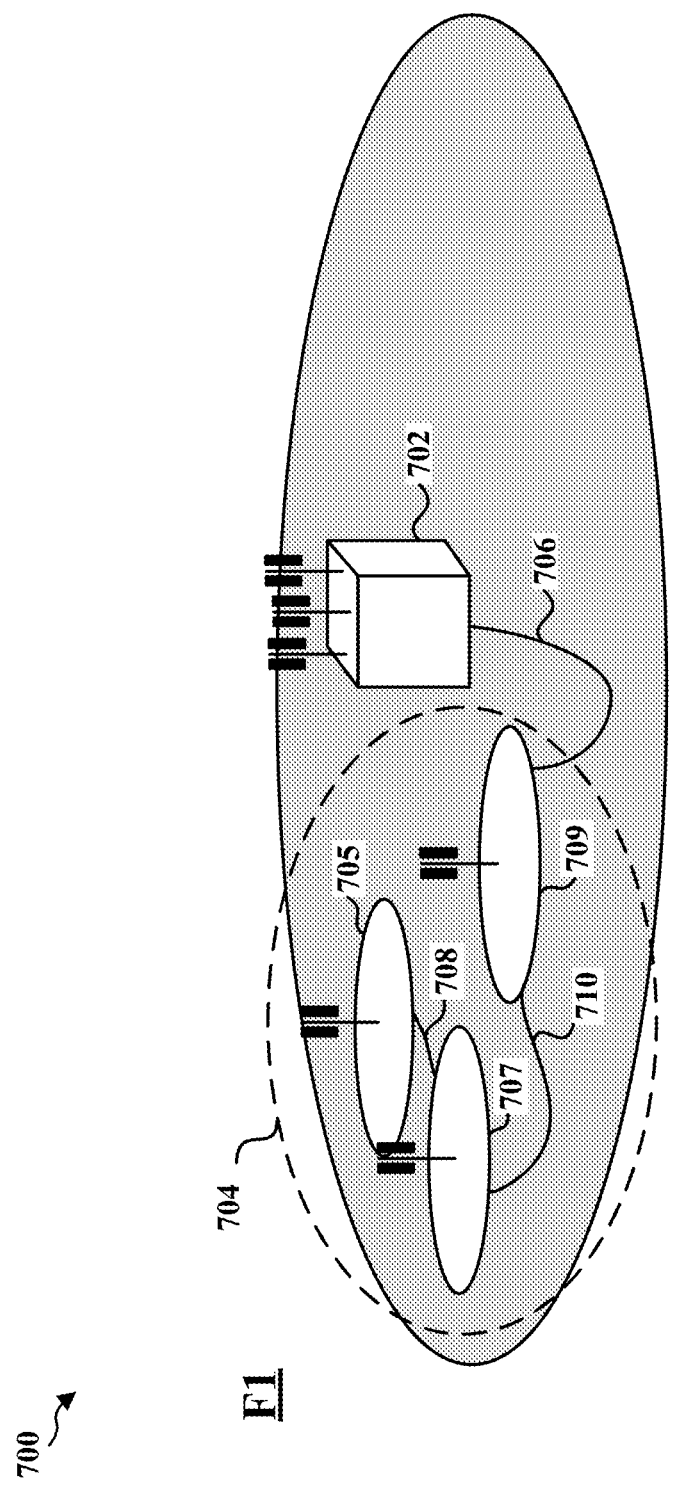
FIG. 7 is a diagram illustrating an example small cell deployment configuration.

FIG. 7 is a diagram 700 illustrating an example small cell deployment configuration. FIG. 7 shows an outdoor deployment of a macro cell 702 and small cells 704, which may operate within the same geographical area. In an aspect, the small cells 704 may include cell 1 705, cell 2 707, and cell 3 709. In FIG. 7, the small cells 704 are coupled to one another through backhaul links 708 and 710. Furthermore, the small cells 704 are coupled to the macro cell 702 thorough backhaul link 706. In the configuration of FIG. 7, the macro cell 702 and small cells 704 share a frequency band (e.g., frequency band F1).

Figure 8:
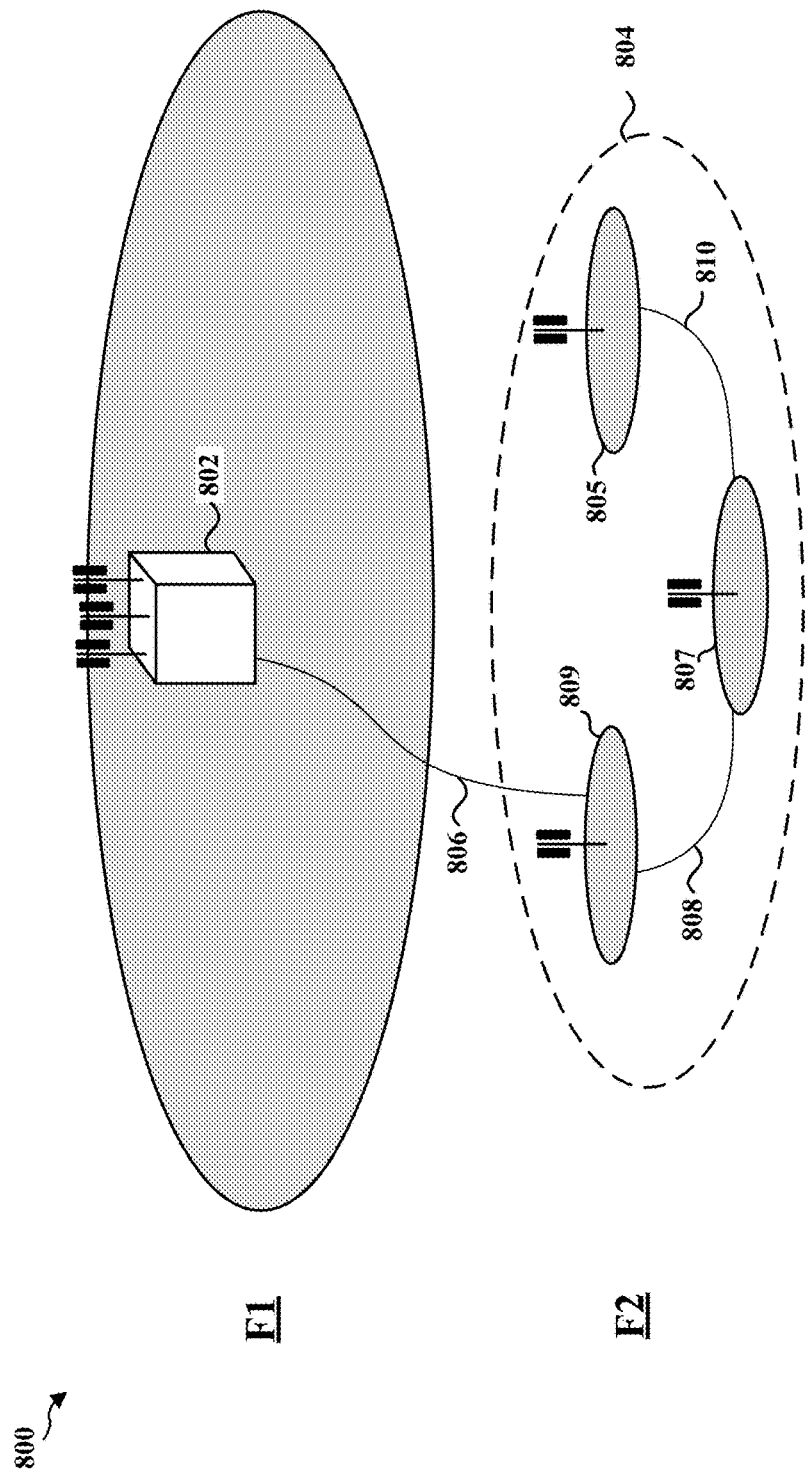
FIG. 8 is a diagram illustrating an example small cell deployment configuration.

FIG. 8 is a diagram 800 illustrating an example small cell deployment configuration. FIG. 8 shows an outdoor deployment of a macro cell 802 and small cells 804, which may operate within the same geographical area. In an aspect, the small cells 804 may include cell 1 805, cell 2 807, and cell 3 809. In FIG. 8, the small cells 804 are coupled to one another through backhaul links 808 and 810. Furthermore, the small cells 804 are coupled to the macro cell 802 thorough backhaul link 806. In the configuration of FIG. 8, the macro cell 802 uses a first frequency band (e.g., frequency band F1) and the small cells 804 use a second frequency band (e.g., frequency band F2) different from the first frequency band.

Figure 9:
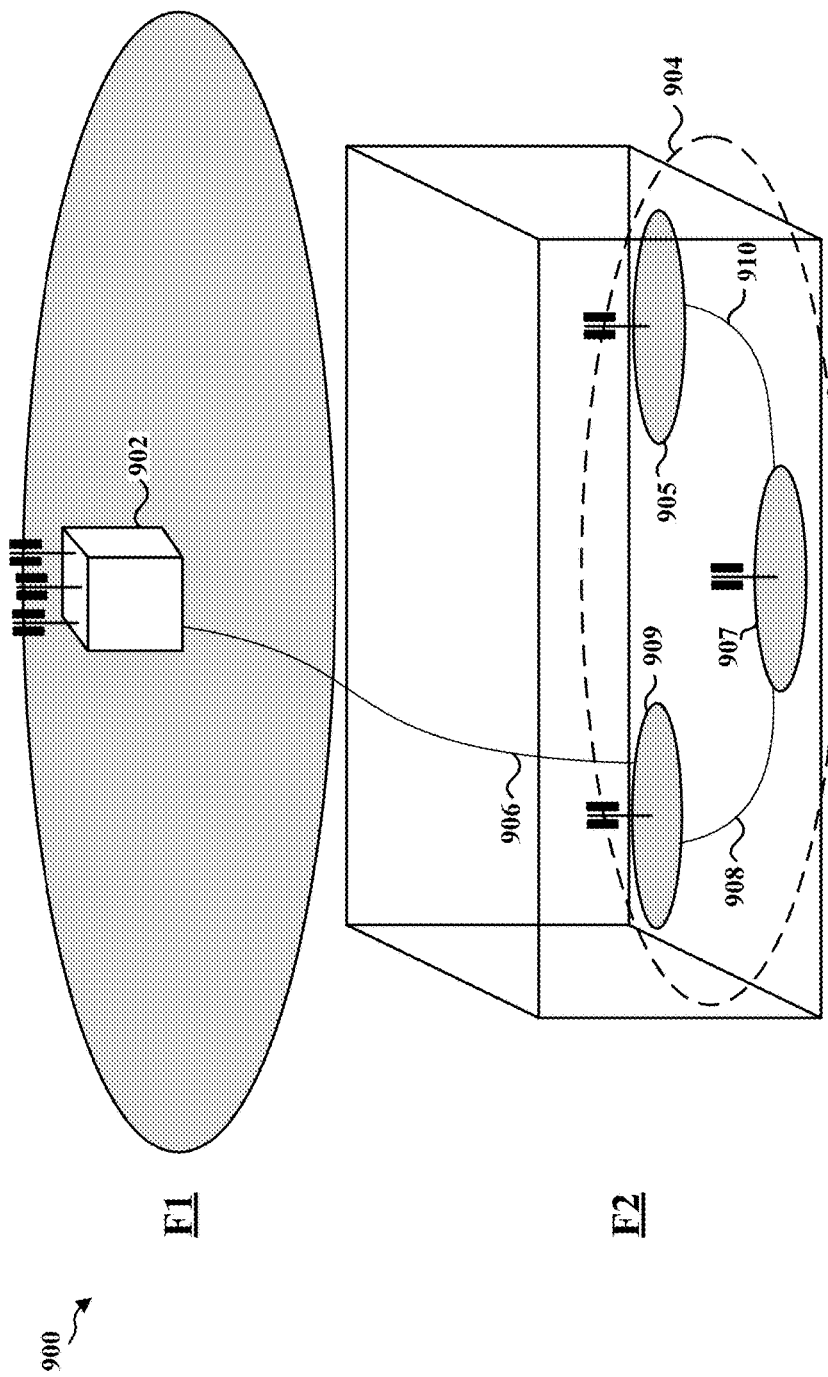
FIG. 9 is a diagram illustrating an example small cell deployment configuration.

FIG. 9 is a diagram 900 illustrating an example small cell deployment configuration. FIG. 9 shows a macro cell 902 that is deployed outdoors and small cells 904 that are deployed indoors, but which may operate within the same geographical area. In an aspect, the small cells 904 may include cell 1 905, cell 2 907, and cell 3 909. In FIG. 9, the small cells 904 are coupled to one another through backhaul links 908 and 910. Furthermore, the small cells 904 are coupled to the macro cell 902 thorough backhaul link 906. In the configuration of FIG. 9, the macro cell 902 uses a first frequency band (e.g., frequency band F1) and the small cells 904 use a second frequency band (e.g., frequency band F2) different from the first frequency band.

Figure 10:
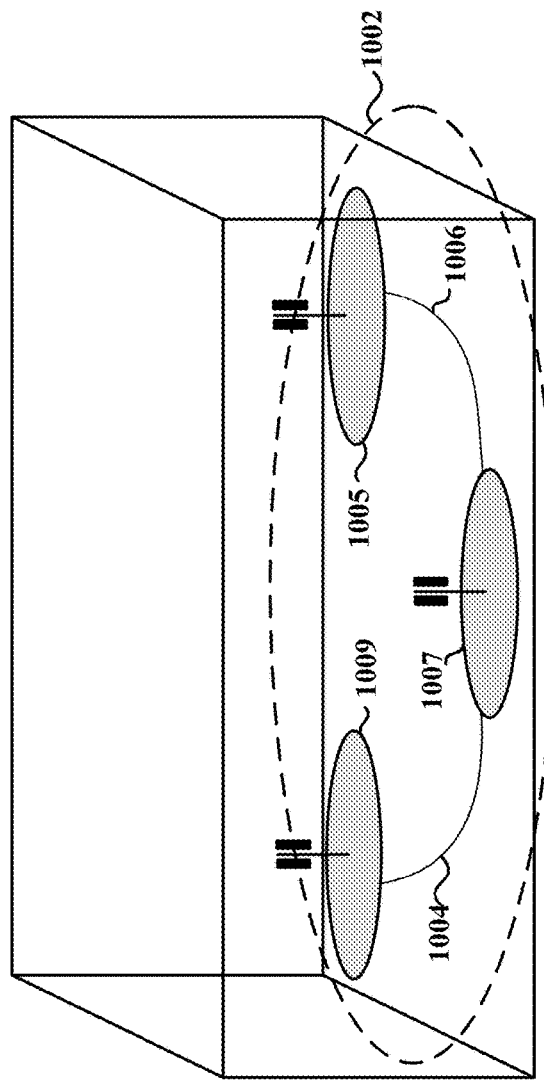
FIG. 10 is a diagram illustrating an example small cell deployment configuration.

FIG. 10 is a diagram 1000 illustrating an example small cell deployment configuration. FIG. 10 shows small cells 1002 that are deployed indoors. In an aspect, the small cells 1002 may include cell 1 1005, cell 2 1007, and cell 3 1009. In FIG. 10, the small cells 1002 are coupled to one another through backhaul links 1004 and 1006. In the configuration of FIG. 10, the small cells 1002 use either a first frequency band (e.g., frequency band F1) or a second frequency band (e.g., frequency band F2). In the configurations of FIGS. 7 through 10, the users may be distributed both for outdoor and indoor deployments.

Small cells (also referred to as base stations (BSs)), femto cells, pico cells, or microcells, typically achieve synchronization using GPS and/or backhaul timing signaling. Alternatively, small cells may achieve synchronization by listening to over-the-air signals (also referred to as network listening) transmitted by other small cells. When using network listening to achieve synchronization, a small cell may acquire timing/frequency information from reference signals transmitted by other small cells. Moreover, such a small cell may provide timing/frequency information via transmission of reference signals to different small cells. Each of the small cells performing network listening may be associated with a synchronization status and a stratum level. For example, a first small cell transmitting reference signals may have a stratum level of N and a second small cell performing network listening using the reference signals may have a stratum level N+1. For example, a first small cell acquiring timing via GPS may have a stratum level 0 (e.g., N=0), while a second small cell performing network listening based on reference signals transmitted by the first small cell may have a stratum level 1 (e.g., N+1=1).

A small cell may monitor the CRSs transmitted from other small cells in the MBSFN region of MBSFN subframes, in special subframes, or via coordinated silence durations. Coordination via backhaul and/or network-wide configuration may be used to ensure proper operation. Information, such as stratum level and synchronization status, may be shared over the backhaul and/or indicated through the arrangement of how network synchronization signals are transmitted.

Some networks may employ dynamic TDD subframe configurations, also referred to as enhanced interference management for traffic adaptation (eIMTA). In one implementation, a system information block 1 (SIB1) may be used to broadcast a particular TDD DL/UL configuration for legacy and new UEs in a semi-static manner. In another implementation, a group or a UE-specific signal can be communicated to new UEs to indicate a different TDD DL/UL subframe configuration in a dynamic manner. For example, such indication may be as fast as 10.0 ms. For example, a UL subframe signaled in SIB1 may be indicated as a DL subframe. In another example, a special subframe in SIB1 may be indicated as a regular DL subframe. In one example, the possible DL/UL subframe configurations dynamically indicated for a UE are limited to pre-configured or standardized DL/UL subframe configurations.

Figure 11:
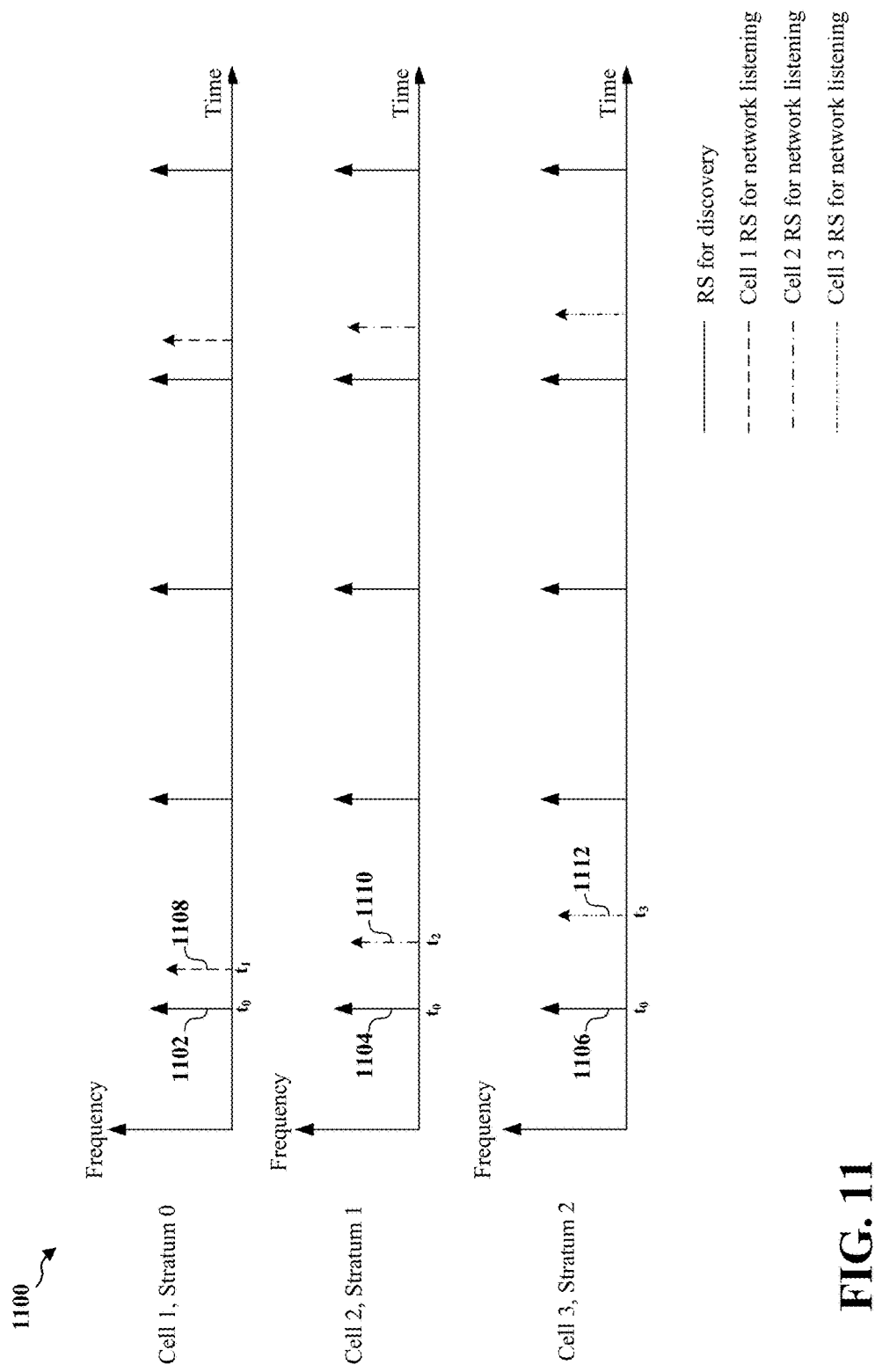
FIG. 11 is a diagram illustrating transmissions of reference signals by small cells.

FIG. 11 is a diagram 1100 illustrating transmissions of reference signals by small cells. FIG. 11, small cells 1, 2, and 3 may transmit reference signals by implementing a TDM scheme. In an aspect, the small cells 1, 2, and 3 may correspond to the small cells in the various deployments discussed supra with respect to FIGS. 7-10. For example, small cells 1, 2, and 3 in FIG. 11 may respectively correspond to cell 1 705, cell 2 707, and cell 3 709 in FIG. 7. As further shown in FIG. 11, each small cell (e.g., cell 1) may transmit a reference signal indicated by a solid line (e.g., reference signal 1102) that serves as a discovery signal and a reference signal indicated by a patterned line (e.g., reference signal 1108) that serves as a network synchronization signal. For example, the reference signals in FIG. 11 may be positioning reference signals (PRSs), CRSs, primary synchronization signals (PSSs), or secondary synchronization signals (SSSs).

In an aspect, the transmission of reference signals that serve as discovery signals may be configured differently from the transmission of reference signals that serve as network synchronization signals. For example, reference signals that serve as discovery signals may be transmitted in a same set of subframes across different small cells. With reference to FIG. 11, for example, cells 1, 2, and 3 may transmit respective reference signals 1102, 1104, and 1106 that serve as discovery signals within the same subframe at time t0. However, reference signals that serve as network synchronization signals (e.g., for network listening) may be transmitted in different subframes for different stratum levels. For example, with reference to FIG. 11, cell 1 at stratum level 0 may transmit reference signal 1108 at time $t_1$, cell 2 at stratum level 1 may transmit reference signal 1110 at time $t_2$, and cell 3 at stratum level 2 may transmit reference signal 1112 at time $t_3$, where $t_1<t_2<t_3$. In an aspect, and as shown in FIG. 11, the reference signals that serve as network synchronization signals may be transmitted with less periodicity than reference signals that serve as discovery signals.

In an aspect, one or more reference signals that serve as network synchronization signals may be transmitted in the same subframe as a reference signal that serves as a discovery signal. In such aspect, the reference signals that serve as discovery signals and the reference signals that serve as network synchronization signals may be separate or different when transmitted in a same subframe.

In an aspect, during a subframe when a small cell (e.g., cell 1) is transmitting a reference signal (e.g., reference signal 1108) that serves as a network synchronization signal, other small cells (e.g., cells 2 and 3) may remain silent (e.g., refrain from transmitting) during that subframe to facilitate network synchronization for the other small cells. For example, as shown in FIG. 11, when cell 1 transmits reference signal 1108 at time $t_1$, cells 2 and 3 remain silent at time $t_1$ to avoid interference with the reference signal 1108. Accordingly, when cell 2 transmits reference signal 1110 at time $t_2$, cell 3 remains silent at time $t_2$ to avoid interference with the reference signal 1110.

In an aspect, reference signals that serve as discovery signals and reference signals that serve as network synchronization signals may be transmitted in a same set of subframes at least for some stratum levels. In such aspect, reference signals that serve as network synchronization signals may be transmitted with less periodicity (at least from a monitoring perspective) than reference signals that serve as discovery signals. In an aspect, the reference signals that serve as network synchronization signals may be the same as the reference signals that serve as discovery signals. In another aspect, the reference signals that serve as network synchronization signals may be different from the reference signals that serve as discovery signals.

In an aspect, reference signals that serve as discovery signals may be based on a CRS and/or a PRS. For example, a small cell may transmit both a CRS and a PRS in a discovery subframe. A small cell may also transmit a PSS and/or SSS in the discovery subframe for cell identification. In an aspect, a CRS may be omitted in an MBSFN region of an MBSFN subframe. In an aspect, the presence of the PSS and/or SSS may depend on subframe indices and system frame structure (e.g., FDD or TDD). For example, when a small cell implements an FDD frame structure, a PSS and/or SSS may be present in subframes 0 and 5 and may not be present in subframes 1-4 and 6-9 of an FDD frame. In such example, a CRS and/or PRS may be used for cell identification when the PSS and/or SSS are not present. Alternatively, in order to facilitate cell identification, the PSS and/or SSS may be present in all subframes containing the discovery signals and/or network synchronization signals.

In an aspect, a UE may perform a measurement using a PRS, a CRS, or a combination of the PRS and CRS. In an aspect, a small cell may configure the bandwidth of the PRS such that the PRS does not always occupy the entire downlink system bandwidth. For example, a small cell may apply a default bandwidth for the PRS that includes the center 6 RBs. In an aspect, the energy per resource element (EPRE) of the PRS may be indicated to the UE or assumed by the UE so that the UE may perform a measurement using a combination of the CRS and PRS. For example, regardless of the bandwidth of the PRS, the UE may assume that the EPRE of the PRS is the same as the EPRE of the CRS.

In an aspect, reference signals that serve as network synchronization signals may be based on the CRS and/or PRS. In an aspect, a small cell may transmit both the CRS and PRS in a network synchronization subframe. In such aspect, the small cell may also transmit a PSS and/or SSS for cell identification. In another aspect, the small cell may not transmit the PSS and/or SSS. In an aspect, the small cell may omit the CRS in the MBSFN region of the MBSFN subframe. In an aspect, a UE may perform a measurement using a PRS, a CRS, or a combination of the PRS and CRS. For example, the UE may use the PRS for cell identification when the CRS and the PSS and/or SSS are not present in a network listening subframe. In an aspect, a small cell may configure the bandwidth of the PRS such that the PRS does not always occupy the entire downlink system bandwidth. For example, a small cell may apply a default bandwidth for the PRS that includes the center 6 RBs.

In an aspect, when a small cell is using a TDD frame structure and applies TDD DL/UL subframe configuration 0 (indicated in SIB1), MBSFN subframes may not be configured for network listening. In an aspect, a small cell may implement guard periods in special subframes for network listening. In an aspect, a small cell may transmit the PRS in special subframes. In such aspect, the transmission of the PRS in guard periods of these special subframes may be a simple truncated version of the PRS in regular subframes.

Figure 12:
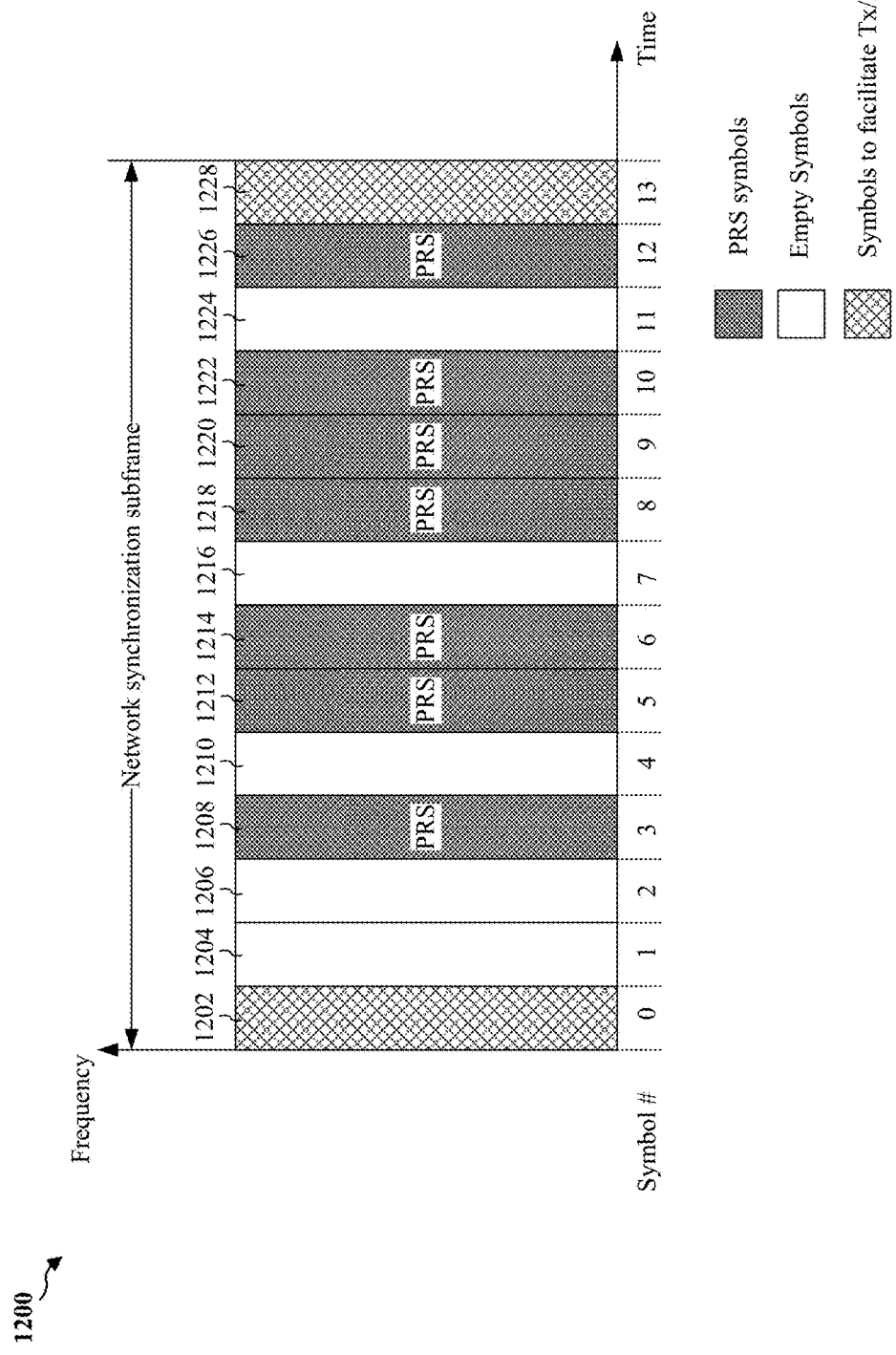
FIG. 12 is a diagram illustrating a subframe of a TDD type frame.

FIG. 12 is a diagram illustrating a subframe 1200 of a TDD type frame. As shown in FIG. 12, the subframe 1200 includes 14 symbols, such as symbols 1202, 1204, 1206, 1208, 1210, 1212, 1214, 1216, 1218, 1220, 1222, 1224, 1226, and 1228 (e.g., symbols 0-13). In other aspects, the subframe 1200 may include a greater or lesser number of symbols. In an aspect, the subframe 1200 may be a UL subframe allocated for UL transmissions by a UE. In such aspect, a small cell may use the subframe 1200 for transmitting reference signals that serve as network synchronization signals. The same cell may ensure, via scheduling or signaling, that no UL transmissions are performed in the subframe. As an example, a small cell may identify the subframe 1200 in a broadcast message or a unicast message to one or more UEs. For example, a small cell may identify the subframe 1200 in a SIB1 broadcast and UEs that receive the SIB1 broadcast may refrain from transmitting in the subframe 1200. As an example, a small cell may identify the subframe 1200 in a dedicated message and UEs that receive the dedicated message may refrain from transmitting in the subframe 1200.

In an aspect, the subframe 1200 allocated as a UL subframe may be used as an MBSFN subframe, a regular DL subframe, or a subframe in which no CRS is transmitted. Accordingly, a small cell may transmit reference signals that serve as network synchronization signals in the subframe 1200. In an aspect, the reference signal may be a PRS, a CRS, a PSS, or an SSS. For example, as shown in FIG. 12, a small cell may transmit PRSs in symbols 1208, 1212, 1214, 1218, 1220, 1222, and 1226 (e.g., symbols 3, 5, 6, 8-10, and 12) of the subframe 1200 and may not transmit in the empty symbols 1204, 1206, 1210, 1216, and 1224 (e.g., empty symbols 1, 2, 4, 7, and 11), where the PRSs enable other small cells to synchronize with the small cell. In an aspect, a small cell performing network listening in the subframe may not transmit during the subframe 1200. In another aspect, a small cell performing network listening in the subframe 1200 may be configured to transmit control information in one or more symbols.

In an aspect, as shown in FIG. 12, a small cell may be configured not to transmit in the first symbol(s) (e.g., symbol 0 in case the small cell does not have legacy control symbols, or symbol 2 in case the small cell has two legacy control symbols in symbol 0 and symbol 1) and/or the last symbol(s) (e.g., symbol 13) in order to facilitate switching by the small cell from UL mode to DL mode (e.g., receive mode to transmit mode) and/or DL mode to UL mode (e.g., transmit mode to receive mode). In an aspect, UEs may be prohibited from transmitting during the subframe 1200. In an aspect, UE transmissions may be managed by a small cell in a transparent manner.

Figure 13:
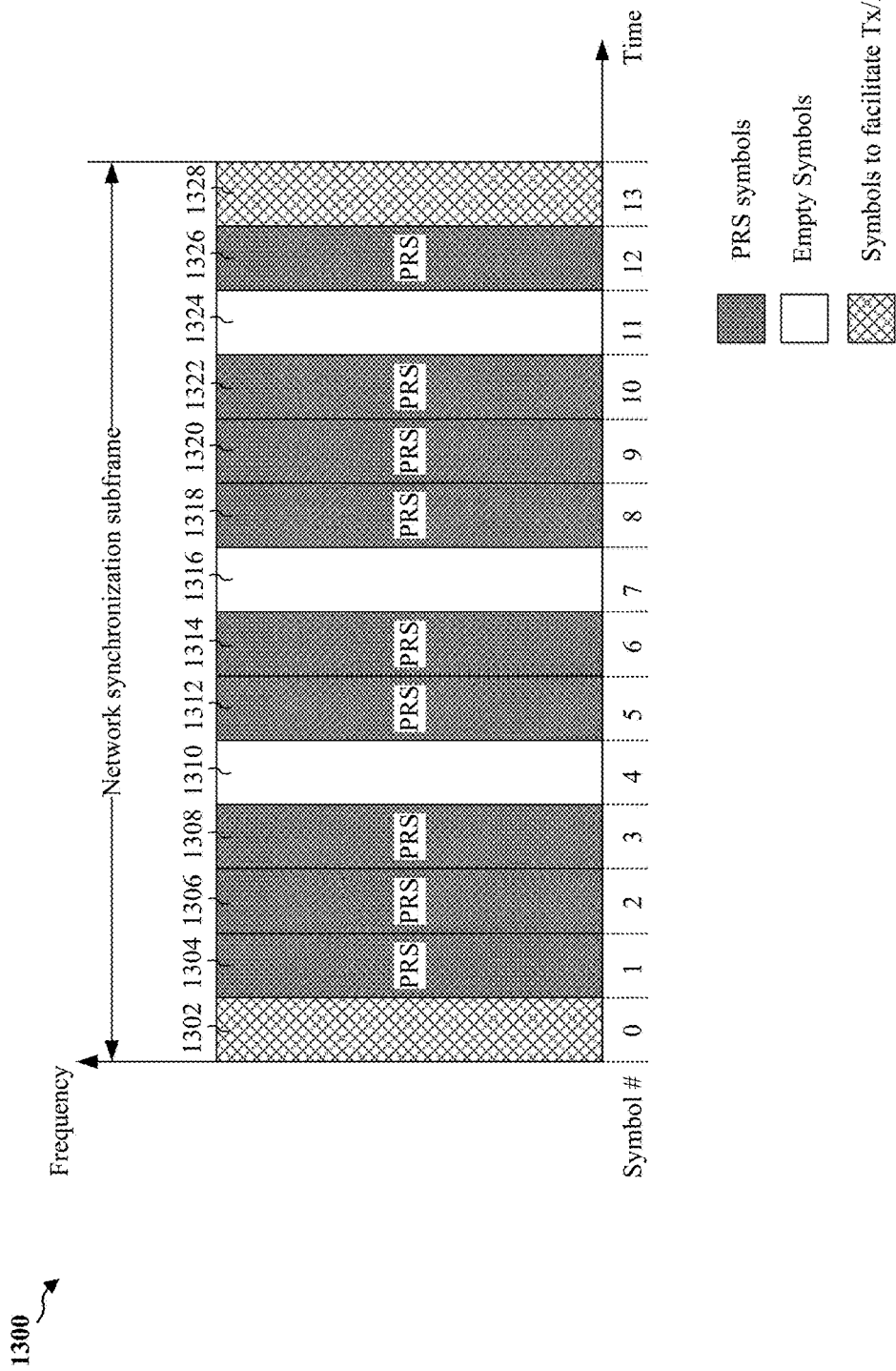
FIG. 13 is a diagram illustrating a subframe of a TDD type frame.

FIG. 13 is a diagram illustrating a subframe 1300 of a TDD type frame. As shown in FIG. 13, the subframe 1300 includes 14 symbols, such as symbols 1302, 1304, 1306, 1308, 1310, 1312, 1314, 1316, 1318, 1320, 1322, 1324, 1326, and 1328 (e.g., symbols 0-13). In other aspects, the subframe 1300 may include a greater or lesser number of symbols. In an aspect, the subframe 1300 may be a UL subframe allocated for UL transmissions by a UE. In such aspect, a small cell may use the subframe 1300 for transmitting reference signals that serve as network synchronization signals. The same cell may ensure, via scheduling or signaling, that no UL transmissions are performed in the subframe. As an example, a small cell may identify the subframe 1300 in a message to one or more UEs. For example, a small cell may identify the subframe 1300 to UEs in a broadcast/groupcast message or a dedicated message and the UEs may refrain from transmitting in the subframe 1300.

In an aspect, the subframe 1300 allocated as a UL subframe may be used as an MBSFN subframe, a regular DL subframe, or a subframe in which no CRS is transmitted. Accordingly, a small cell may transmit reference signals that serve as network synchronization signals in the subframe 1300. In an aspect, the reference signal may be a PRS, a CRS, a PSS, or an SSS. For example, as shown in FIG. 13, a small cell may transmit PRSs in symbols 1304, 1306, 1308, 1312, 1314, 1318, 1320, 1322, and 1326 (e.g., symbols 1-3, 5, 6, 8-10, and 12) of the subframe 1300 and may not transmit in the empty symbols 1310, 1316, and 1324 (e.g., empty symbols 4, 7, and 11), where the PRSs enable other small cells to synchronize with the small cell. In an aspect, a small cell performing network listening in the subframe may not to transmit during the subframe 1300. In another aspect, a small cell performing network listening in the subframe 1300 may be configured to transmit control information in one or more symbols.

In an aspect, as shown in FIG. 13, the small cell may be configured not to transmit in the first symbol(s) (e.g., symbol 0) and/or the last symbol(s) (e.g., symbol 13) in order to facilitate switching by the small cell from UL mode to DL mode and/or DL mode to UL mode. In an aspect, UEs may be prohibited from transmitting during the subframe 1300. In an aspect, UE transmissions may be managed by a small cell in a transparent manner.

Figure 14:
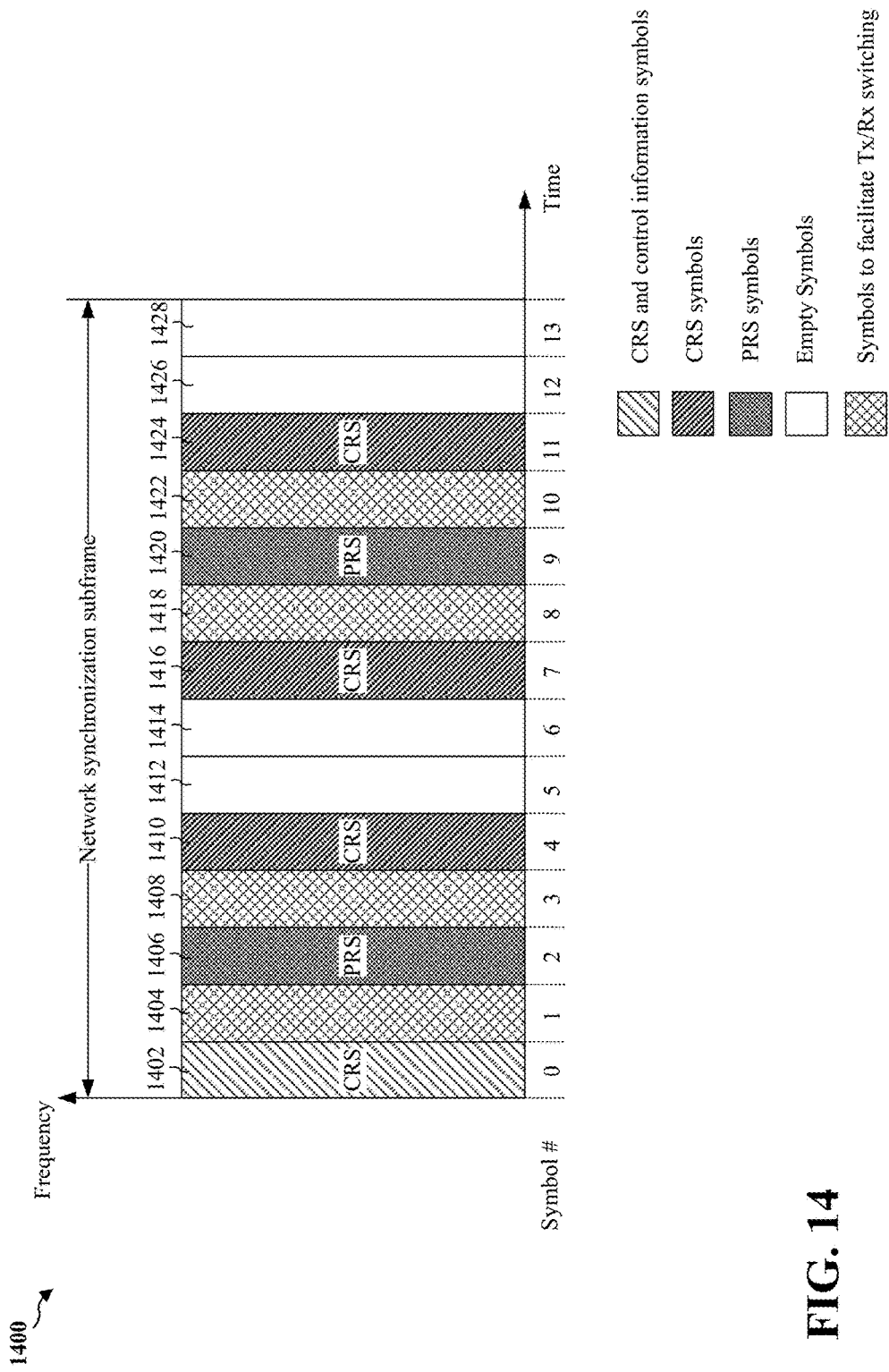
FIG. 14 is a diagram illustrating a subframe of a TDD type frame.

FIG. 14 is a diagram illustrating a subframe 1400 of a TDD type frame. As shown in FIG. 14, the subframe 1400 includes 14 symbols, such as symbols 1402, 1404, 1406, 1408, 1410, 1412, 1414, 1416, 1418, 1420, 1422, 1424, 1426, and 1428 (e.g., symbols 0-13). In other aspects, the subframe 1400 may include a greater or lesser number of symbols. In an aspect, the subframe 1400 may be a DL subframe allocated for DL transmissions by a small cell. In such aspect, a small cell may use the subframe 1400 for transmitting and/or receiving reference signals that serve as network synchronization signals.

In an aspect, with reference to FIG. 14, a small cell performing network listening may transmit reference signals in one or more symbols of the subframe 1400 when the subframe 1400 is not an MBSFN subframe (e.g., when CRS still needs to be transmitted). For example, the small cell may transmit a CRS and control information in symbol 1402 (e.g., symbol 0) and CRSs in symbols 1410, 1416, and 1424 (e.g., symbols 4, 7, and 11). As shown in FIG. 14, the small cell may perform network listening by receiving reference signals that serve as network synchronization signals in one or more symbols of the subframe 1400. For example, the small cell may receive a PRS in symbols 1406 and 1420 (e.g., symbols 2 and 9) of subframe 1400. As further shown in FIG. 14, the subframe 1400 may include reserved symbols to facilitate switching by the small cell from UL mode to DL mode and/or DL mode to UL mode. For example, after transmitting the CRS and control information in symbol 0, the small cell may switch from the DL mode to the UL mode during symbol 1404 (e.g., symbol 1) in order to receive the PRS in symbol 1406 (e.g., symbol 2). The small cell may then switch from the UL mode to the DL mode during symbol 1408 (e.g., symbol 3) in order to transmit the CRS in symbol 1410 (e.g., symbol 4). In another aspect, when a small cell is not performing network listening and is configured to transmit reference signals that serve as network synchronization signals, the small cell may transmit such reference signals (e.g., PRS) in the subframe 1400 to enable other small cells to synchronize with the small cell.

In an aspect, a cyclic prefix (CP) for reference signals that serve as discovery signals and/or network synchronization signals is determined. The cyclic prefix may be at least one of a normal CP or an extended CP. If PRS is used as the reference signals that serve as discovery signals and/or network synchronization signals, the CP for the reference signals may be determined in the same manner as the CP for a PRS used for positioning purposes. Alternatively, the CP for the PRS that serves as discovery signals and/or network synchronization signals may be separately determined compared with the CP for the PRS used for positioning purposes. As an example, for a given small cell, the CP for the PRS that serves as discovery signals and/or network synchronization signals may be determined as a normal CP, while the CP for the PRS used for positioning purposes may be determined as an extended CP.

In an aspect, each periodic transmission instance of discovery signals and/or network synchronization signals may span L subframe(s), where L≥1. As an example, network synchronization signals may be transmitted by a small cell every 640 ms, and within each transmission instance, the network synchronization signals may be transmitted in two consecutive subframes. The L subframes can be consecutive subframes. Examples of consecutive subframes may include consecutive downlink subframes (i.e., excluding uplink subframes), or consecutive fixed downlink subframes (i.e., excluding uplink subframes, and downlink subframes subject to dynamic change of subframe directions), or consecutive subframes including special subframes and/or uplink subframes. The L subframes can be non-consecutive subframes as well. As an example, if L=2, the two subframes can be subframes 0 and 5. The parameter L can be predetermined or configurable. If the parameter L is configurable, the parameter L may be indicated to a UE or a neighboring small cell via a broadcast message or a dedicated message. The UE or the neighboring small cell may utilize these L consecutive subframes to improve discovery related performance and/or network synchronization related performance, e.g., via coherently or non-coherent combining.

In an aspect, a small cell may transmit parameters associated with reference signals that serve as discovery signals and/or network synchronization signals to one or more UEs and/or one or more other nodes (such as eNBs). For example, the parameters may include the configured bandwidth for a reference signal, information identifying a subframe that includes the reference signal, a stratum level, and/or an energy per resource element (EPRE) of a reference signal. In an aspect, a small cell may broadcast such parameters itself. In another aspect, the parameters may be broadcast to the one or more UEs from a different small cell using the same or different carrier frequencies. In another aspect, a small cell may transmit the parameters to one or more UEs via dedicated signaling for RRC connected UEs. In another aspect, a small cell may transmit the parameters to one or more UEs via backhaul signaling.

Figure 15:
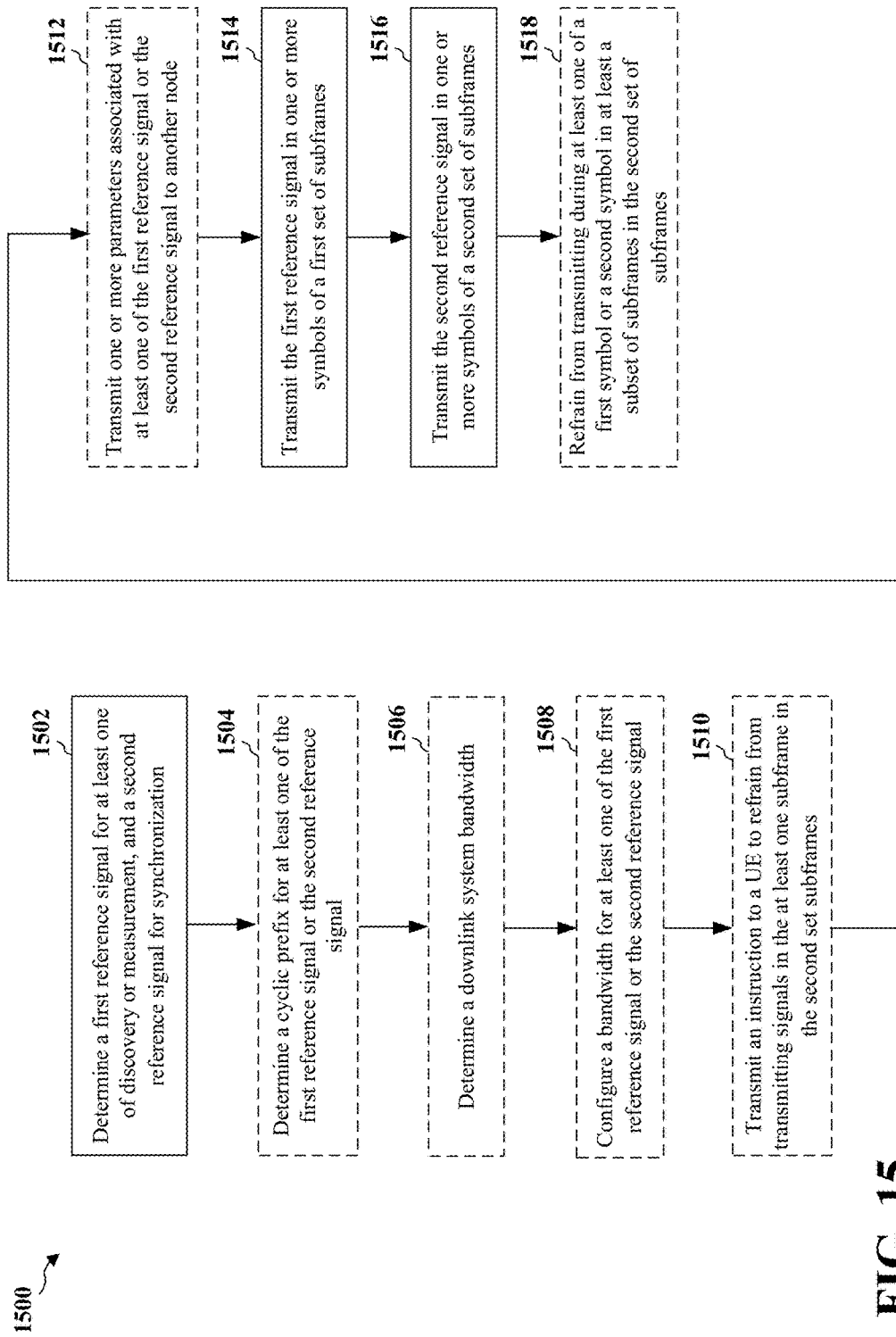
FIG. 15 is a flow chart of a method of wireless communication.

FIG. 15 is a flow chart 1500 of a method of wireless communication. The method may be performed by an eNB. It should be understood that the steps represented with dotted lines in FIG. 15 represent optional steps. As such, steps 1504, 1506, 1508, 1510, 1512, and 1518 represent optional steps in the wireless communication method 1500.

At step 1502, the eNB determines a first reference signal for at least one of discovery or measurement, and a second reference signal for synchronization. This may include scheduling the first and second reference signals for transmission to one or more UEs. In an aspect, both the first reference signal and the second reference signal may be based on a same type of reference signal, such as a PRS, a CRS, a PSS, or an SSS. For example, the first reference signal may allow a UE near the eNB to discover the eNB. For example, the second reference signal may allow a second eNB to synchronize with the eNB.

At step 1504, the eNB determines a cyclic prefix for at least one of the first reference signal or the second reference signal, where the determined cyclic prefix is different from a cyclic prefix of the common reference signal.

At step 1506, the eNB determines a downlink system bandwidth of the eNB. For example, the eNB may determine the downlink system bandwidth by identifying a memory address of a memory device in which the downlink system bandwidth is stored and by executing an instruction to retrieve the downlink system bandwidth.

At step 1508, the eNB configures a bandwidth for the first reference signal and/or the second reference signal. In an aspect, the configured bandwidth may be equal to the downlink system bandwidth. In another aspect, the configured bandwidth is less than the downlink system bandwidth. For example, the eNB may configure the bandwidth by selecting a suitable bandwidth that is less than the downlink system bandwidth.

At step 1510, the eNB transmits an instruction to the UE to refrain from transmitting signals in the at least one subframe in the second set of subframes. This allows the small cell to use the subframe for network and discovery signals, without uplink interference from the UE.

At step 1512, the eNB transmits one or more parameters associated with the first reference signal and/or the second reference signal to another node. In an aspect, the node may be a UE or another eNB. In an aspect, the one or more parameters may include the configured bandwidth, information identifying a subframe (that includes at least one of the first reference signal or the second reference signal), a stratum level, and/or an EPRE of at least one of the first reference signal or the second reference signal.

At step 1514, the eNB transmits the first reference signal in one or more symbols of a first set of subframes. In an aspect, the first reference signal is transmitted using the configured bandwidth.

At step 1516, the eNB transmits the second reference signal in one or more symbols of a second set of subframes. In an aspect, the second reference signal is transmitted using the configured bandwidth. In an aspect, the first set of subframes and the second set of subframes differ at least by one subframe, such that the first set of subframes and second set of subframes are not identical. In an aspect, at least one subframe in the second set of subframes is one of a special subframe or a UL subframe, wherein at least a portion of the at least one subframe is allocated for transmission of UL signals by a UE. In an aspect, the first set of subframes and/or the second set of subframes is based on a periodic configuration. In an aspect, the first reference signal and/or the second reference signal is transmitted in two or more consecutive subframes.

Finally, at step 1518, the eNB refrains from transmitting during a first symbol and/or a second symbol in at least a subset of subframes in the second set of subframes. In an aspect, the first symbol precedes the one or more symbols in which the second reference signal is transmitted and the second symbol is subsequent to the one or more symbols in which the second reference signal is transmitted. In an aspect, the first symbol is a beginning symbol in a subframe and the second symbol is an ending symbol in a subframe.

Figure 16:
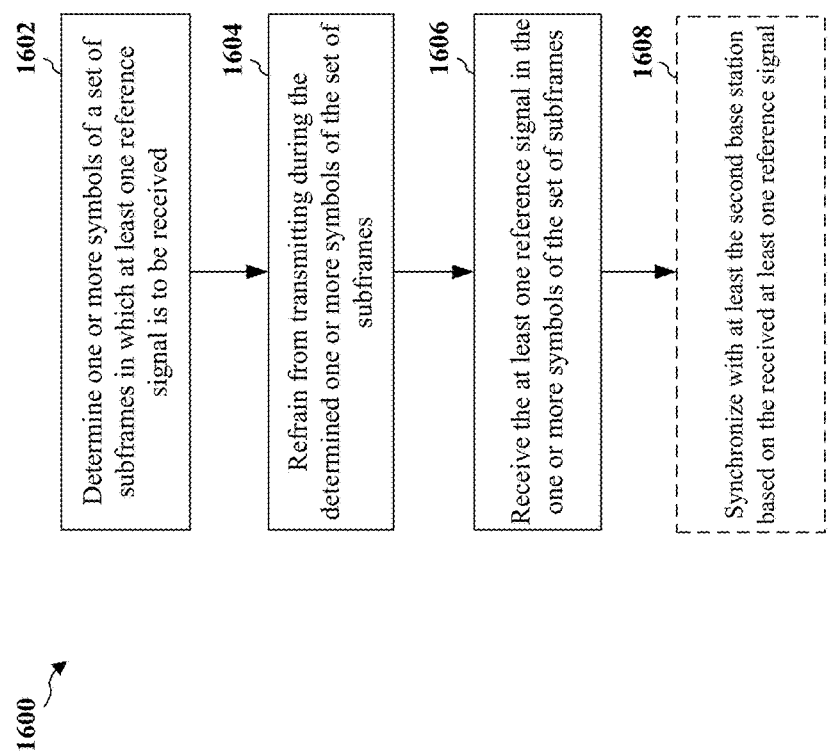
FIG. 16 is a flow chart of a method of wireless communication.

FIG. 16 is a flow chart 1600 of a method of wireless communication. The method may be performed by an eNB. It should be understood that the steps represented with dotted lines in FIG. 16 represent optional steps. As such, step 1608 represents an optional step in the wireless communication method 1600.

At step 1602, the eNB determines one or more symbols of a set of subframes in which at least one reference signal is to be received. In an aspect, the at least one reference signal is for synchronization with at least a second eNB. In an aspect, each of the set of subframes is one of a special subframe or a UL subframe, where at least a portion of the special subframe or the UL subframe is allocated for transmission of UL signals by a UE. In an aspect, the at least one reference signal is a PRS.

At step 1604, the eNB refrains from transmitting during the determined one or more symbols of the set of subframes.

At step 1606, the eNB receives the at least one reference signal in the one or more symbols of the set of subframes.

Finally, at step 1608, the eNB synchronizes with at least the second base station based on the received at least one reference signal.

Figure 17:
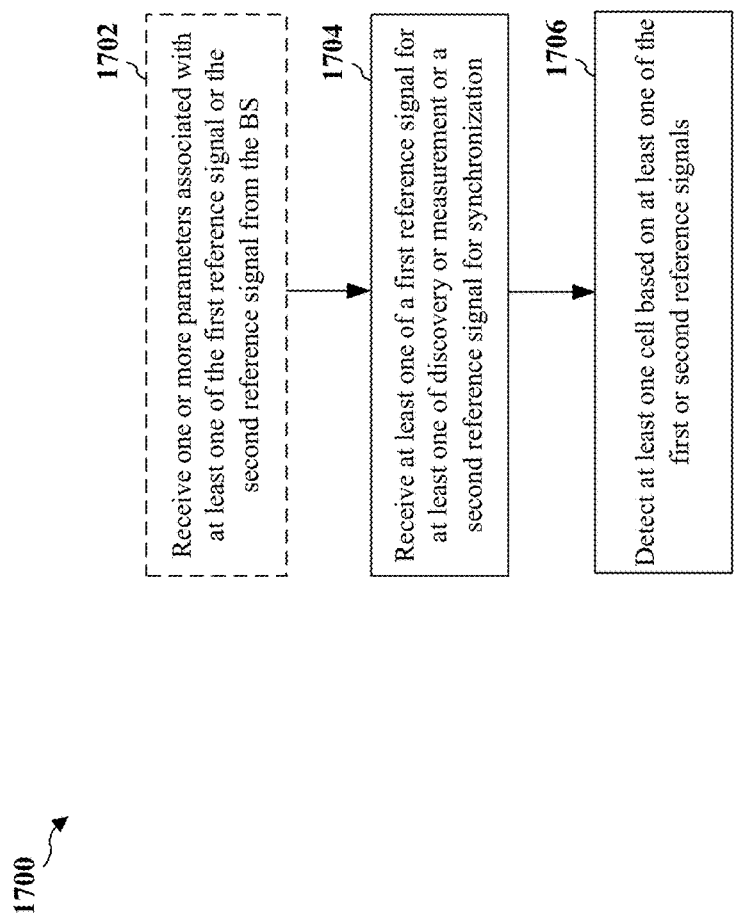
FIG. 17 is a flow chart of a method of wireless communication.

FIG. 17 is a flow chart 1700 of a method of wireless communication. The method may be performed by a UE. It should be understood that the steps represented with dotted lines in FIG. 17 represent optional steps. As such, step 1702 represents an optional step in the wireless communication method 1700.

At step 1702, the UE receives one or more parameters associated with a first reference signal and/or a second reference signal from the eNB. In an aspect, the one or more parameters may include the configured bandwidth, information identifying a subframe that includes at least one of the first reference signal or the second reference signal, a stratum level, and/or an EPRE of at least one of the first reference signal or the second reference signal.

At step 1704, the UE receives a first reference signal for at least one of discovery or measurement and/or a second reference signal for synchronization. In an aspect, the first and/or second reference signals have a bandwidth configured by the eNB. In an aspect, the bandwidth is less than a downlink system bandwidth of the eNB. In an aspect, the first and/or second reference signals are based on a same type of reference signal, such as a PRS, a CRS, a PSS, or an SSS.

Finally, at step 1706, the UE detects at least one cell (e.g., eNB) based on at least one of the first or second reference signals.

Figure 18:
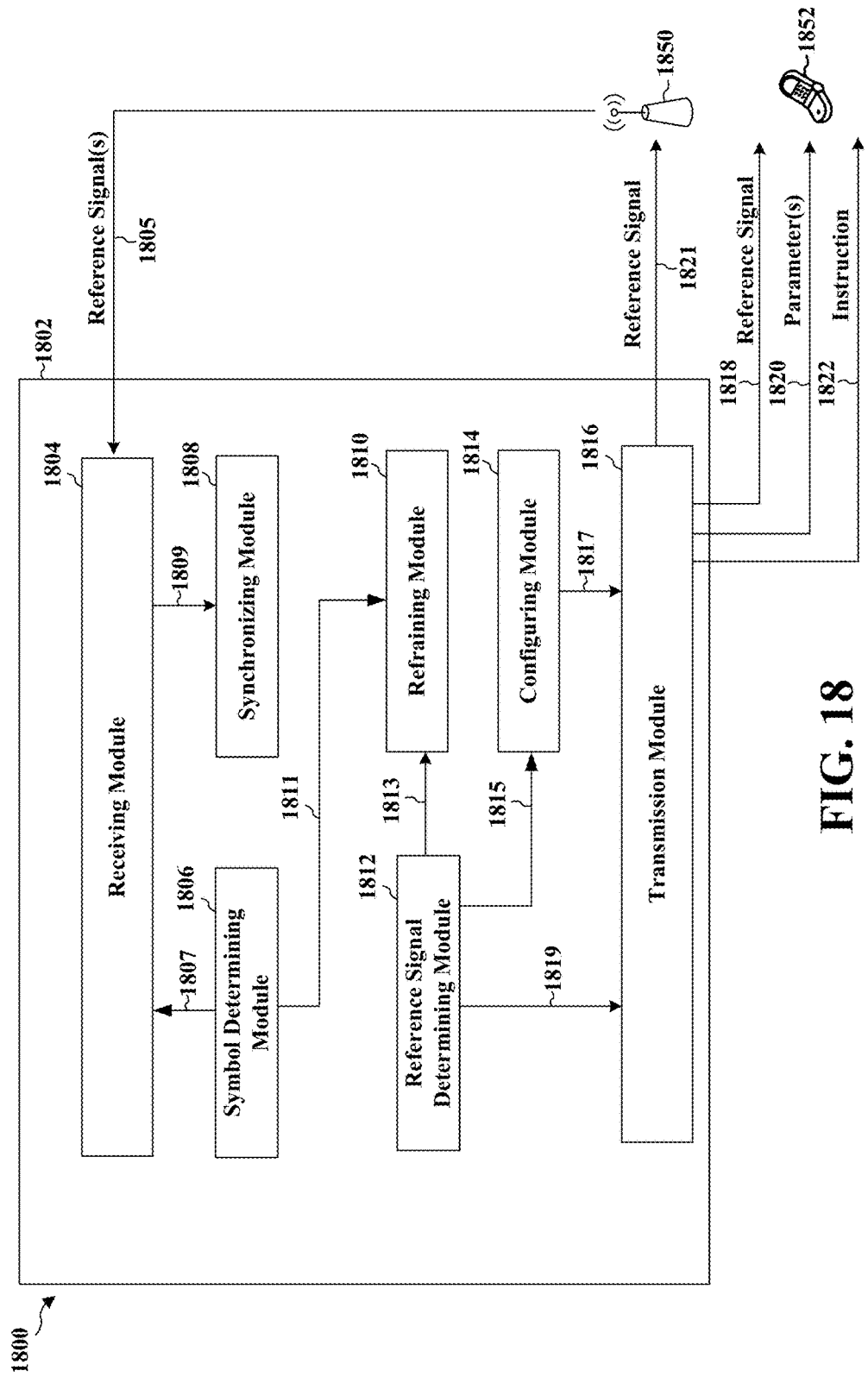
FIG. 18 is a conceptual data flow diagram illustrating the data flow between different modules/means/components in an exemplary apparatus.

FIG. 18 is a conceptual data flow diagram 1800 illustrating the data flow between different modules/means/components in an exemplary apparatus 1802. The apparatus may be an eNB. The apparatus includes a module 1804 that receives at least one reference signal 1805 in one or more symbols of a set of subframes. The apparatus further includes a module 1806 that determines a subframe in which the at least one reference signal 1805 is to be received. In an aspect, the module 1806 may provide the determined subframe to the receiving module in signal 1807. The apparatus further includes a module 1808 that receives the at least one reference signal 1805 and synchronizes with at least a second base station 1850 based on the received at least one reference signal 1805. For example, module 1808 may receive the at least one reference signal 1805 in signal 1809 from the receiving module 1804. The apparatus further includes a module 1812 that determines a first reference signal for at least one of discovery or measurement and a second reference signal for synchronization, determines a cyclic prefix for at least one of the first reference signal or the second reference signal, and determines a downlink system bandwidth of the eNB. The apparatus further includes a module 1814 that configures a bandwidth for the first reference signal and/or the second reference signal. In an aspect, the module 1814 receives a signal 1815 indicating the determined downlink system bandwidth from the module 1812. The apparatus further includes a module 1816 that receives the first and second reference signals via signal 1819 from module 1812 and receives the determined bandwidth(s) 1817 from the module 1814. The module 1816 transmits the first reference signal 1818 in one or more symbols of a first set of subframes and transmits the second reference signal 1821 in one or more symbols of a second set of subframes. The module 1816 further transmits one or more parameters 1820 associated with the first reference signal and/or the second reference signal to another node, and transmits an instruction 1822 to the UE 1852 to refrain from transmitting signals in the at least one subframe in the second set of subframes. The apparatus further includes a module 1810 that refrains from transmitting during a first symbol and/or a second symbol in at least a subset of subframes in a second set of subframes and refrains from transmitting during the determined one or more symbols of the set of subframes in which at least one reference signal is to be received. In an aspect, the first symbol and/or the second symbol in at least a subset of subframes in a second set of subframes is received from the module 1812 in signal 1813. In an aspect, the subframe in which the at least one reference signal (e.g., reference signal 1805) is to be received is indicated to the refraining module 1810 in signal 1811.

The apparatus may include additional modules that perform each of the steps of the algorithm in the aforementioned flow charts of FIGS. 15 and 16. As such, each step in the aforementioned flow charts of FIGS. 15 and 16 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 19:
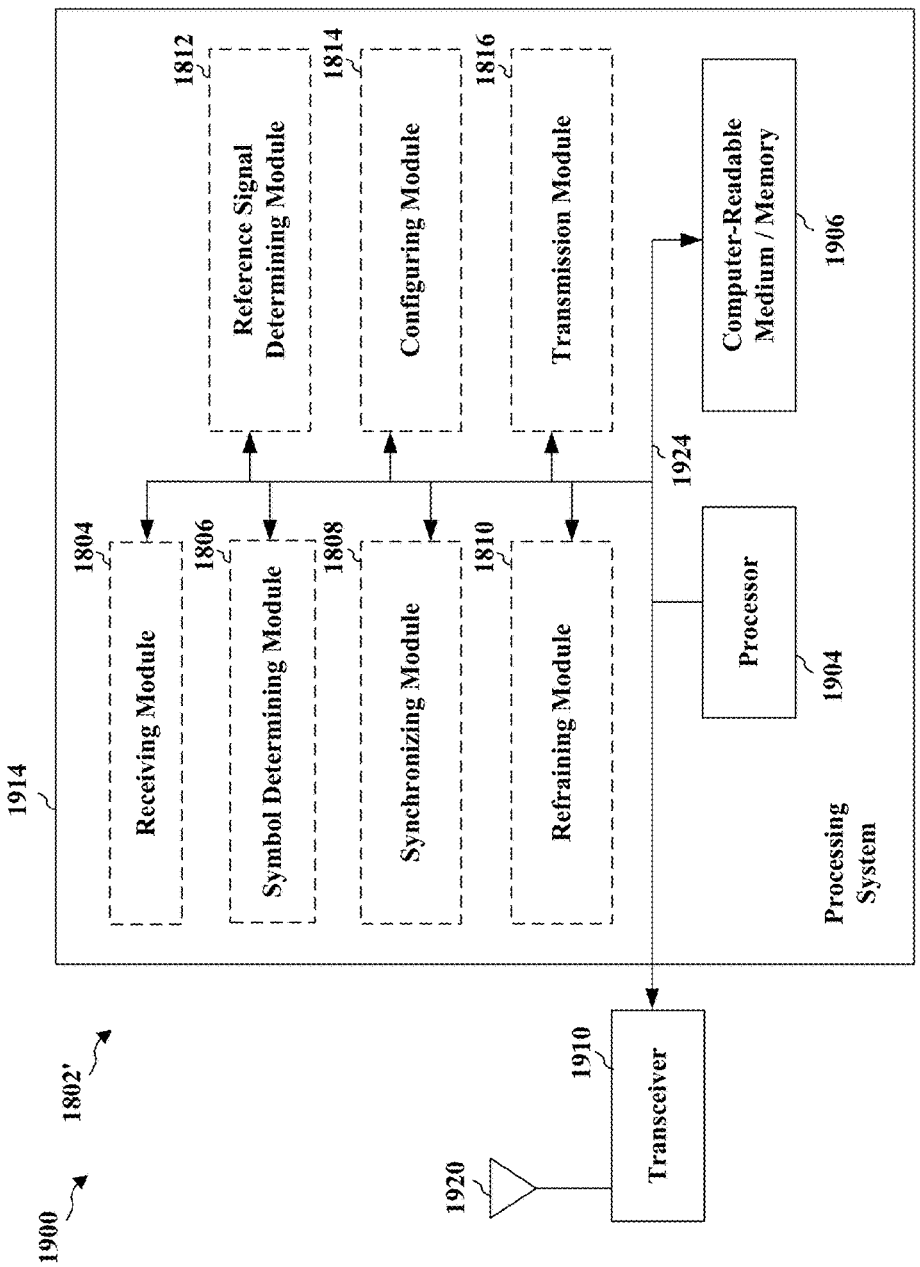
FIG. 19 is a diagram illustrating an example of a hardware implementation for an apparatus employing a processing system.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware modules, represented by the processor 1904, the modules 1804, 1806, 1808, 1810, 1812, 1814, and 1816, and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the receiving module 1804. In addition, the transceiver 1910 receives information from the processing system 1914, specifically the transmission module 1816, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system further includes at least one of the modules 1804, 1806, 1808, 1810, 1812, 1814, and 1816. The modules may be software modules running in the processor 1904, resident/stored in the computer readable medium/memory 1906, one or more hardware modules coupled to the processor 1904, or some combination thereof. The processing system 1914 may be a component of the eNB 610 and may include the memory 676 and/or at least one of the TX processor 616, the RX processor 670, and the controller/processor 675.

In one configuration, the apparatus 1802/1802' for wireless communication includes means for determining a first reference signal for at least one of discovery or measurement, and a second reference signal for synchronization, means for transmitting the first reference signal in one or more symbols of a first set of subframes, means for transmitting the second reference signal in one or more symbols of a second set of subframes, means for refraining from transmitting during at least one of a first symbol or a second symbol in at least a subset of subframes in the second set of subframes, where the first symbol precedes the one or more symbols in which the second reference signal is transmitted and the second symbol is subsequent to the one or more symbols in which the second reference signal is transmitted, means for transmitting an instruction to a UE to refrain from transmitting signals in the at least one subframe in the second set of subframes, means for configuring a bandwidth for at least one of the first reference signal or the second reference signal, means for determining a downlink system bandwidth of the first BS base station, wherein the configured bandwidth is less than the downlink system bandwidth, means for transmitting one or more parameters associated with at least one of the first reference signal or the second reference signal to another node, means for transmitting at least one of a CRS, a PSS, and/or an SSS, means for determining a cyclic prefix for at least one of the first reference signal or the second reference signal, where the determined cyclic prefix is different from a cyclic prefix of the common reference signal, means for determining a subframe in which at least one reference signal is to be received, means for refraining from transmitting during at least one symbol of the subframe in which the at least one reference signal is to be received, means for receiving the at least one reference signal in the subframe, means for synchronizing with at least the second base station based on the received at least one reference signal. The aforementioned means may be one or more of the aforementioned modules of the apparatus 1802 and/or the processing system 1914 of the apparatus 1802' configured to perform the functions recited by the aforementioned means. As described supra, the processing system 1914 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 20:
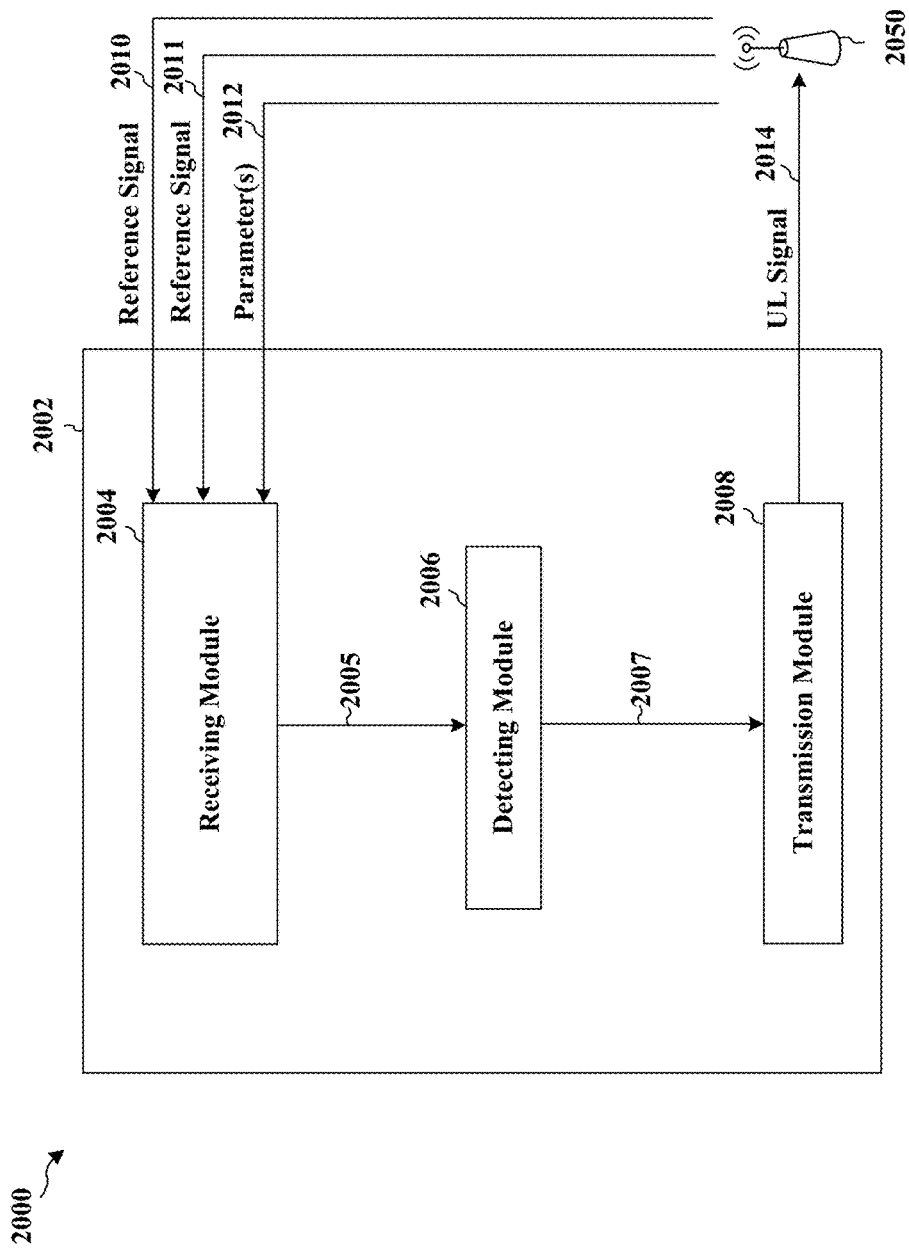
FIG. 20 is a conceptual data flow diagram illustrating the data flow between different modules/means/components in an exemplary apparatus.

FIG. 20 is a conceptual data flow diagram 2000 illustrating the data flow between different modules/means/components in an exemplary apparatus 2002. The apparatus may be a UE. The apparatus includes a module 2004 that receives one or more parameters (e.g., parameter(s) 2012) associated with a first reference signal and/or a second reference signal from an eNB (e.g., eNB 2050), and receives a first reference signal (e.g., reference signal 2010) for at least one of discovery or measurement and/or a second reference signal (e.g., reference signal 2011) for synchronization, where the first and/or second reference signals have a bandwidth configured by the eNB. The apparatus further includes a module 2006 that receives a signal 2005 indicating the at least one of the first or second reference signals and detects at least one cell (e.g., eNB 2050) based on at least one of the first or second reference signals. The apparatus further includes a module 2008 that receives a signal 2007 indicating the detected at least one cell (e.g., eNB 2050) and transmits UL signals (e.g., UL signal 2014) to the at least one cell (e.g., eNB 2050).

The apparatus may include additional modules that perform each of the steps of the algorithm in the aforementioned flow chart of FIG. 17. As such, each step in the aforementioned flow chart of FIG. 17 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 21:
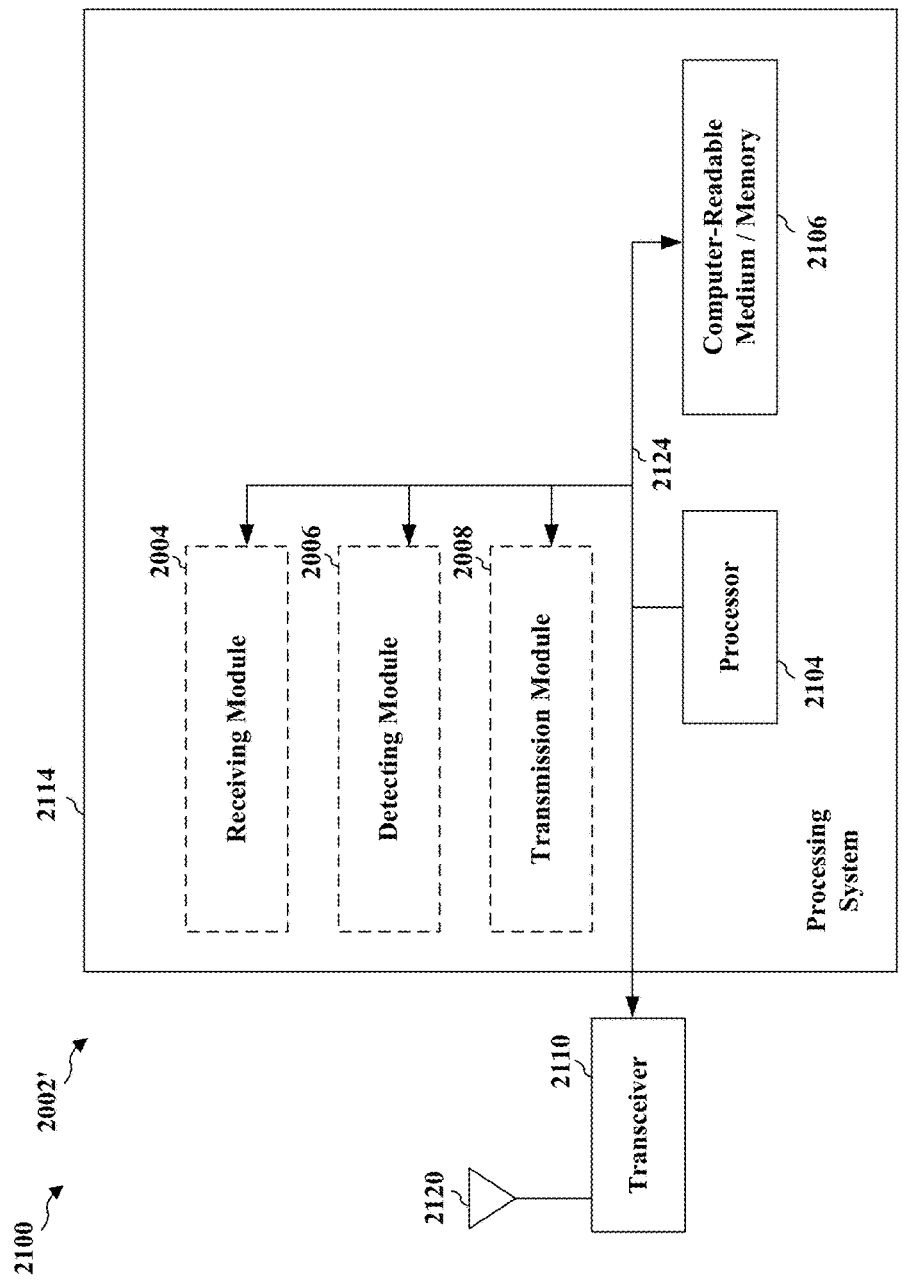
FIG. 21 is a diagram illustrating an example of a hardware implementation for an apparatus employing a processing system.

FIG. 21 is a diagram 2100 illustrating an example of a hardware implementation for an apparatus 2002' employing a processing system 2114. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors and/or hardware modules, represented by the processor 2104, the modules 2004, 2006, and 2008, and the computer-readable medium/memory 2106. The bus 2124 may also link various other circuits such as timing sources, peripherals, voltage regulators, and power management circuits, which are well known in the art, and therefore, will not be described any further.

The processing system 2114 may be coupled to a transceiver 2110. The transceiver 2110 is coupled to one or more antennas 2120. The transceiver 2110 provides a means for communicating with various other apparatus over a transmission medium. The transceiver 2110 receives a signal from the one or more antennas 2120, extracts information from the received signal, and provides the extracted information to the processing system 2114, specifically the receiving module 2004. In addition, the transceiver 2110 receives information from the processing system 2114, specifically the transmission module 2008, and based on the received information, generates a signal to be applied to the one or more antennas 2120. The processing system 2114 includes a processor 2104 coupled to a computer-readable medium/memory 2106. The processor 2104 is responsible for general processing, including the execution of software stored on the computer-readable medium/memory 2106. The software, when executed by the processor 2104, causes the processing system 2114 to perform the various functions described supra for any particular apparatus. The computer-readable medium/memory 2106 may also be used for storing data that is manipulated by the processor 2104 when executing software. The processing system further includes at least one of the modules 2004, 2006, and 2008. The modules may be software modules running in the processor 2104, resident/stored in the computer readable medium/memory 2106, one or more hardware modules coupled to the processor 2104, or some combination thereof. The processing system 2114 may be a component of the UE 650 and may include the memory 660 and/or at least one of the TX processor 668, the RX processor 656, and the controller/processor 659.

In one configuration, the apparatus 2002/2002' for wireless communication includes means for receiving at least one of a first reference signal for at least one of discovery or measurement or a second reference signal for synchronization, means for detecting at least one cell based on at least one of the first or second reference signals, means for receiving one or more parameters associated with at least one of the first reference signal or the second reference signal from the BS, and means for transmitting UL signals. The aforementioned means may be one or more of the aforementioned modules of the apparatus 2002 and/or the processing system 2114 of the apparatus 2002' configured to perform the functions recited by the aforementioned means. As described supra, the processing system 2114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication for a first base station (BS) comprising:
    determining, by the first BS, one or more symbols of a first set of subframes in which at least one reference signal is to be received, wherein the at least one reference signal is for synchronization with at least a second BS, wherein discovery reference signals and the at least one reference signal for synchronization are separately managed;
    refraining, by the first BS, from transmitting during the determined one or more symbols and during at least one of a first symbol or a second symbol in at least a subset of subframes in the first set of subframes, the first symbol preceding the one or more symbols in which the at least one reference signal for synchronization is received from the second BS and the second symbol being subsequent to the one or more symbols in which the at least one reference signal for synchronization is received from the second BS;
    transmitting, by the first BS, a discovery reference signal during a second set of one or more symbols when the at least second BS transmits a second discovery reference signal; and
    receiving the at least one reference signal for synchronization in the one or more symbols of the first set of subframes.

2. The method of claim 1, further comprising:
synchronizing with at least the second BS based on the received at least one reference signal.

3. The method of claim 1, wherein each of the first set of subframes is one of a special subframe or an uplink (UL) subframe, at least a portion of the special subframe or the UL subframe being allocated for transmission of UL signals by a user equipment (UE).

4. The method of claim 1, wherein the at least one reference signal is based on at least one of:
a cell-specific reference signal (CRS),
a primary synchronization signal (PSS),
a secondary synchronization signal (SSS); or
a positioning reference signal (PRS).

5. The method of claim 1, wherein the at least one reference signal is based on a positioning reference signal (PRS).

6. The method of claim 5, further comprising:
using the at least one reference signal based on the PRS to synchronized with the second BS.

7. The method of claim 1, wherein the discovery reference signal and the at least one reference signal for synchronization are based on a same type of reference signal.

8. The method of claim 1, wherein the discovery reference signal is transmitted in a same subframe across cells and the at least one reference signal for synchronization is transmitted in a subframe based on a stratum level of the second BS.

9. The method of claim 1, wherein the at least one reference signal for synchronization is received in a guard period of a special subframe.

10. The method of claim 9, wherein the at least one reference signal for synchronization comprises a truncated version of a positioning reference signal (PRS).

11. The method of claim 1, further comprising:
transmitting a synchronization reference signal in a subframe when the first base station is not performing network listening.

12. The method of claim 1, wherein the at least one reference signal for synchronization comprises periodic transmission instances spanning an integer number of subframes, wherein the integer number is greater than one, the method further comprising:
receiving an indication of the integer number.

13. The method of claim 12, wherein the at least one reference signal for synchronization comprises periodic transmission instances spanning the integer number of consecutive subframes.

14. An apparatus for wireless communication at a first base station (BS), comprising:
means for determining, by the first BS, one or more symbols of a first set of subframes in which at least one reference signal is to be received, wherein the at least one reference signal is for synchronization with at least a second BS, wherein discovery reference signals and the at least one reference signal for synchronization are separately managed;
means for refraining, by the first BS, from transmitting during the determined one or more symbols and during at least one of a first symbol or a second symbol in at least a subset of subframes in the first set of subframes, the first symbol preceding the one or more symbols in which the at least one reference signal for synchronization is received from the second BS and the second symbol being subsequent to the one or more symbols in which the at least one reference signal for synchronization is received from the second BS;
means for transmitting, by the first BS, a discovery reference signal during a second set of one or more symbols when the at least second BS transmits a second discovery reference signal; and
means for receiving the at least one reference signal for synchronization in the one or more symbols of the first set of subframes.

15. The apparatus of claim 14, further comprising:
means for synchronizing with at least the second BS based on the received at least one reference signal.

16. The apparatus of claim 14, wherein each of the first set of subframes is one of a special subframe or an uplink (UL) subframe, at least a portion of the special subframe or the UL subframe being allocated for transmission of UL signals by a user equipment (UE).

17. The apparatus of claim 14, wherein the at least one reference signal is based on at least one of:
a cell-specific reference signal (CRS),
a primary synchronization signal (PSS),
a secondary synchronization signal (SSS); or
a positioning reference signal (PRS).

18. The apparatus of claim 14, wherein the at least one reference signal is based on a positioning reference signal (PRS).

19. An apparatus for wireless communication at a first base station (BS), comprising:
a memory; and
at least one processor coupled to the memory and configured to:
determine, by the first BS, one or more symbols of a first set of subframes in which at least one reference signal is to be received, wherein the at least one reference signal is for synchronization with at least a second BS, wherein discovery reference signals and the at least one reference signal for synchronization are separately managed;
refrain, by the first BS, from transmitting during the determined one or more symbols and during at least one of a first symbol or a second symbol in at least a subset of subframes in the first set of subframes, the first symbol preceding the one or more symbols in which the at least one reference signal for synchronization is received from the second BS and the second symbol being subsequent to the one or more symbols in which the at least one reference signal for synchronization is received from the second BS;
transmit, by the first BS, a discovery reference signal during a second set of one or more symbols when the at least second BS transmits a second discovery reference signal; and
receive the at least one reference signal for synchronization in the one or more symbols of the first set of subframes.

20. The apparatus of claim 19, wherein the at least one processor is further configured to:
synchronize with at least the second BS based on the received at least one reference signal.

21. The apparatus of claim 19, wherein each of the first set of subframes is one of a special subframe or an uplink (UL) subframe, at least a portion of the special subframe or the UL subframe being allocated for transmission of UL signals by a user equipment (UE).

22. The apparatus of claim 19, wherein the at least one reference signal is based on at least one of:
a cell-specific reference signal (CRS),
a primary synchronization signal (PSS), a secondary synchronization signal (SSS); or a positioning reference signal (PRS).

23. The apparatus of claim 19, wherein the at least one reference signal is based on a positioning reference signal (PRS).

24. A non-transitory computer-readable medium storing computer executable code for wireless communication at a first base station (BS), comprising code to:

determine, by the first BS, one or more symbols of a first set of subframes in which at least one reference signal is to be received, wherein the at least one reference signal is for synchronization with at least a second BS, wherein discovery reference signals and the at least one reference signal for synchronization are separately managed;

refrain, by the first BS, from transmitting during the determined one or more symbols and during at least one of a first symbol or a second symbol in at least a subset of subframes in the first set of subframes, the first symbol preceding the one or more symbols in which the at least one reference signal for synchronization is received from the second BS and the second symbol being subsequent to the one or more symbols in which the at least one reference signal for synchronization is received from the second BS;

transmit, by the first BS, a discovery reference signal during a second set of one or more symbols when the at least second BS transmits a second discovery reference signal; and receive the at least one reference signal for synchronization in the one or more symbols of the first set of subframes.

25. The computer-readable medium of claim 24, further comprising code to:

synchronize with at least the second BS based on the received at least one reference signal.

26. The computer-readable medium of claim 24, wherein each of the first set of subframes is one of a special subframe or an uplink (UL) subframe, at least a portion of the special subframe or the UL subframe being allocated for transmission of UL signals by a user equipment (UE).

27. The computer-readable medium of claim 24, wherein the at least one reference signal is based on at least one of:

a cell-specific reference signal (CRS), a primary synchronization signal (PSS), a secondary synchronization signal (SSS); or a positioning reference signal (PRS).

28. The computer-readable medium of claim 24, wherein the at least one reference signal is based on a positioning reference signal (PRS).

* * * * *